AFTER-HOUR BANK DEPOSITORY

Filed April 20, 1970 10 Sheets-Sheet 1

INVENTORS
Charles U. Deaton,
Paul A. Leipelt and
Leo J. Grosswiller, Jr.
BY
Frease & Bishop
ATTORNEYS INVENTORS
Charles U. Deaton,
Paul A. Leipelt and
Leo J. Grosswiller, Jr.
BY
Frease & Bishop
ATTORNEYS

AFTER-HOUR BANK DEPOSITORY

INVENTORS
Charles U. Deaton,
Paul A. Leipelt and
Leo J. Grosswiller, Jr.

BY Frease & Bishop
ATTORNEYS

AFTER-HOUR BANK DEPOSITORY

Filed April 20, 1970

INVENTORS
Charles U. Deaton,
Paul A. Leipelt and
Leo J. Grosswiller, Jr.
BY
Frease & Bishop
ATTORNEYS INVENTORS
Charles U. Deaton,
Paul A. Leipelt and
Leo J. Grosswiller, Jr.
BY
Frease & Bishop
ATTORNEYS

AFTER-HOUR BANK DEPOSITORY

Filed April 20, 1970 10 Sheets-Sheet 6

INVENTORS
Charles U. Deaton,
Paul A. Leipelt and
Leo J. Grosswiller, Jr.

BY

Frease & Bishop

ATTORNEYS

Oct. 26, 1971 C. U. DEATON ET AL 3,615,050

AFTER-HOUR BANK DEPOSITORY

Filed April 20, 1970 10 Sheets-Sheet 7

INVENTORS
Charles U. Deaton,
Paul A. Leipelt and
Leo J. Grosswiller, Jr.

BY

Frease & Bishop

ATTORNEYS

AFTER-HOUR BANK DEPOSITORY

INVENTORS
Charles U. Deaton,
Paul A. Leipelt and
Leo J. Grosswiller, Jr.
BY
Frease & Bishop
ATTORNEYS

AFTER-HOUR BANK DEPOSITORY

INVENTORS
Charles U. Deaton,
Paul A. Leipelt and
Leo J. Grosswiller, Jr.
Frease & Bishop
ATTORNEYS

AFTER-HOUR BANK DEPOSITORY

Filed April 20, 1970 10 Sheets-Sheet 10

INVENTORS
Charles U. Deaton,
Paul A. Leipelt and
Leo J. Grossweiller, Jr.
BY
Frease & Bishop
ATTORNEYS Patented Oct. 26, 1971

3,615,050
AFTER-HOUR BANK DEPOSITORY

Charles U. Deaton, Denver, Colo., and Paul A. Leipelt, Canton, and Leo J. Grosswiller, Jr., East Canton, Ohio, assignors to Diebold, Incorporated, Canton, Ohio
Filed Apr. 20, 1970, Ser. No. 29,824
Int. Cl. E05g *1/00*
U.S. Cl. 232—43.3 32 Claims

ABSTRACT OF THE DISCLOSURE

An electrically operated automatic after-hour bank depository which has a movable security chamber for handling bags or receiving envelopes. The security chamber is closed by a key locked main door having an envelope slot therethrough. A secondary door closes the main door and envelope slot. A bag or an envelope deposited in the security chamber, either by opening the main and secondary doors, or by envelope insertion through the slot upon opening the secondary door, after closure of the doors is automatically conveyed in the security chamber by a power operated truck mechanism to a horizontally located opening at the rear of the unit through which the bag or envelope drops vertically downward through a chute into a receiving chest or safe. Closing of the doors initiates automatically the movement of the deposit to the receiving chest. The doors are deadlocked upon closing and cannot be opened until the depositing cycle of operation has been completed and the parts restored to a position ready to receive a new deposit. A customer key is required for a bag deposit. The unit is deadlocked in event of power failure, or malfunction in the system, or tampering with the circuitry or mechanism. The unit structure is physically locked to the receiving chest and can be released only by access from within the chest. The entire unit is trim and compact and occupies a minimum of space when installed.

REFERENCE TO RELATED PATENTS

The invention constitutes improvements upon the depository constructions of U.S. Patent Nos. 3,028,074, 3,059,839, and 3,114,499.

BACKGROUND OF THE INVENTION

Field of the invention

The invention relates to after-hour bank depositories and more particularly to a compact depository construction which receives either an envelope type deposit or a bag deposit, initially in the same chamber, where, once received, the deposit (either envelope or bag) is secure, and is conveyed by power to a vertical chute leading to a receiving chest within the walls of the bank or other building equipped with the depository.

Description of the prior art

Many types of bank depositories have been used, both manually operated, or power driven. Usually separate units or mechanisms have been provided for selectively receiving or handling letters or bags, which ultimately usually reach the receiving chest by different or separate paths and ordinarily by moving or sliding down slanted chutes. Prior depository installations handling both letters and bags usually have had the separate letter and bag units located one above the other, or side by side, or in rotary bins. Thus, combination or rotary units have occupied considerable wall space when installed in the wall of a bank building and the like.

The angled or sloping chutes required by many prior devices reduces the amount of receiving chest capacity that is used, and reduces the height of a chest that may be installed in a normal manner with the chest floor six inches above the location of the sidewalk.

In some prior combination units, comprising separate letter and bag handling devices, the degree of protection afforded throughout the deposit cycle, from customer deposit in the unit to containment of the deposit in the receiving chest, has not been the same for both letter and bag deposits.

Also most prior devices, particularly those accepting bags, normally have required the customer to use both hands in making a deposit.

Thus, difficulties have existed in the art involving space requirements, receiving chest capacity limitations, lack of complete protection throughout the entire depository cycle for both envelopes and bags in combined depositories, and lack of simplicity and convenience in operation or use by a customer and especially at drive-in facilities.

SUMMARY OF THE INVENTION

Objectives of the invention includes providing a combined envelope and bag receiving bank depository unit which utilizes one and the same medium, vehicle or mechanism for handling the deposit upon receipt thereof in an initial rectangular or box-like security chamber until the deposit physically reaches the receiving chest, thus giving maximum protection with minimum space requirements; providing a simplified construction which enables maximum chest capacity to be used as well as the largest sized standard chests in a normal (sidewalk six inches below floor of chest) installation; providing a construction having door means for a security chamber and an envelope slot in the door means communicating with the chamber in which the closing of the door means actuates automatically an electrically operated conveyor mechanism which transfers the security chamber (all the while maintained secure) and its contained envelope or bag deposit to an opening at the top of a vertical chute through which the deposit drops into the receiving chest, and in which the door means cannot be opened during the deposit cycle until the security chamber has been returned to initial or normal deposit receiving location; providing a construction which is simple and compact in design, installation, and operaion, convenient and secure in use, which is adapted for one-handed operation as a drive-in facility, and which minimizes the margin for customer error; and providing a construction which avoids the difficulties inherent in prior devices and obtains the indicated advantages and solves problems and satisfies needs existing in the art.

These and other objectives and advantages may be obtained by the depository construction, the general eral nature of which may be stated as including a housing sleeve adapted to be installed in a generally horizontally extending position in a building wall, the sleeve having top, bottom, and side walls forming a front opening, an opening in the bottom wall at the rear of the sleeve, and a discharge chute extending within the building wall downward from said sleeve opening adapted to communicate with a receiving chest; a box-like main depository housing mounted in said sleeve having cut-out, L-shaped top and bottom walls and side walls one of which is elongated, said housing walls forming a rectangular front opening within the front sleeve opening, and the bottom wall cut-out communicating with the sleeve bottom wall opening and discharge chute; drive means including a drive shaft extending within the housing along the elongated side wall; truck means including a rear crosswall, a longitudinal security wall, and a primary generally rectangular door formed with an envelope slot pivotally mounted on a vertical axis at the front end of the longitudinal wall; said longitudinal wall having its rear end mounted on the crosswall spaced laterally from the elongated housing side wall; the truck means being slidably mounted for rectilinear movement rearward and forward within the housing, and there being a driving connection between the crosswall and drive shaft whereby the drive means may move the truck means between a normal deposit-receiving forward position and a deposit-discharging rearward position within the housing; a secondary generally rectangular door pivotally mounted on a vertical axis at the front end of said housing closing the housing front opening; the pivot axes of the primary and secondary doors being coaxial and the doors being adjacent one another when the truck means is in normal position; control bar means movably mounted on and relative to and for movement with the truck means extending in the space between the elongated housing wall and security wall, spring means reacting between the primary door and control bar means biasing the primary door to open and the control bar means to move forward with respect to the security wall; the control bar being pivotally engaged at its forward end with both doors when the control bar means and doors are in normal position and being movable out of normal position upon opening and closing movement of the secondary door to a position latching the primary door closed; latch bar means pivotally connected with the secondary door and housing actuated upon opening and closing movement of the secondary door to latch the secondary door closed when closed; key-operated-lock-controlled slide bolt means mounted on the housing bolting the primary door against opening when the latter is in normal deposit-receiving position and movable from bolted to unbolted position upon unlocking the key-operated lock; sliding latch means mounted on the housing and engaged with the secondary door biased to latching position latching the slide bolt means in either bolted or unbolted position upon opening the secondary door; said primary door opening automatically along with the opening of the secondary door when the slide bolt means is in unbolted position; the truck crosswall, longitudinal security wall, and primary door, and the housing top, bottom, and side wall opposite the elongated wall forming a box-like security deposit-receiving chamber within the housing accessible for receiving a deposit when the truck means is in normal position and movable with the truck means to convey a deposit therein to the chute when the truck means moves to deposit-discharging position; sensing door means pivotally mounted at its upper end on the rear end of the cut-out portion of the housing top wall and normally disposed flush with the front face of the truck crosswall when the latter is in normal position, means on the truck means engaging the sensing door means to repeatedly swing the latter rearwardly upward as the truck means moves toward deposit-discharging position and releasing the sensing door means upon arrival of the truck means at deposit-discharging position whereby the sensing door means sweeps downward through the security chamber on arrival at deposit-discharging position to detect any object remaining in the security chamber; solenoid released spring-actuated latch pin means latching the secondary door latch bar means in door latching position when the solenoid is deenergized; secondary bolt means independent of said latch pin means mounted on the housing actuated upon movement of the truck means away from normal position to bolt the secondary door latch bar means in latching position; switch means actuated upon arrival of the control bar means at primary door latching position to energize the drive means to convey the truck means to deposit-discharging position; means actuated upon arrival of the truck means at deposit-discharging position to stop the drive means and reset the same for reverse movement; means actuated by the sensing door upon sensing the absence of retained matter in the security chamber to energize the drive means to convey the truck means back to normal position; means actuated upon arrival of the truck means at normal position to stop the drive means and reset the same for reverse movement, and to energize the solenoid released pin means to unlatch the secondary door; cam plate means having releasable engagement with the control bar means and truck means actuated upon arrival of the truck means at normal position to release the control bar latching of the primary door, and to reset the control bar means in normal position; and means releasable from the interior of the building wall locking the housing in the sleeve.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set forth in the appended claims.

Similar numerals refer to similar parts throughout the drawings.

DESCRIPTION OF THE PREFERRED EMBODIMENT

The improved after-hour depository is indicated generally at 1. It may be installed in a wall 2 of a bank or other building.

Outer housing sleeve

Figures 1, 2:
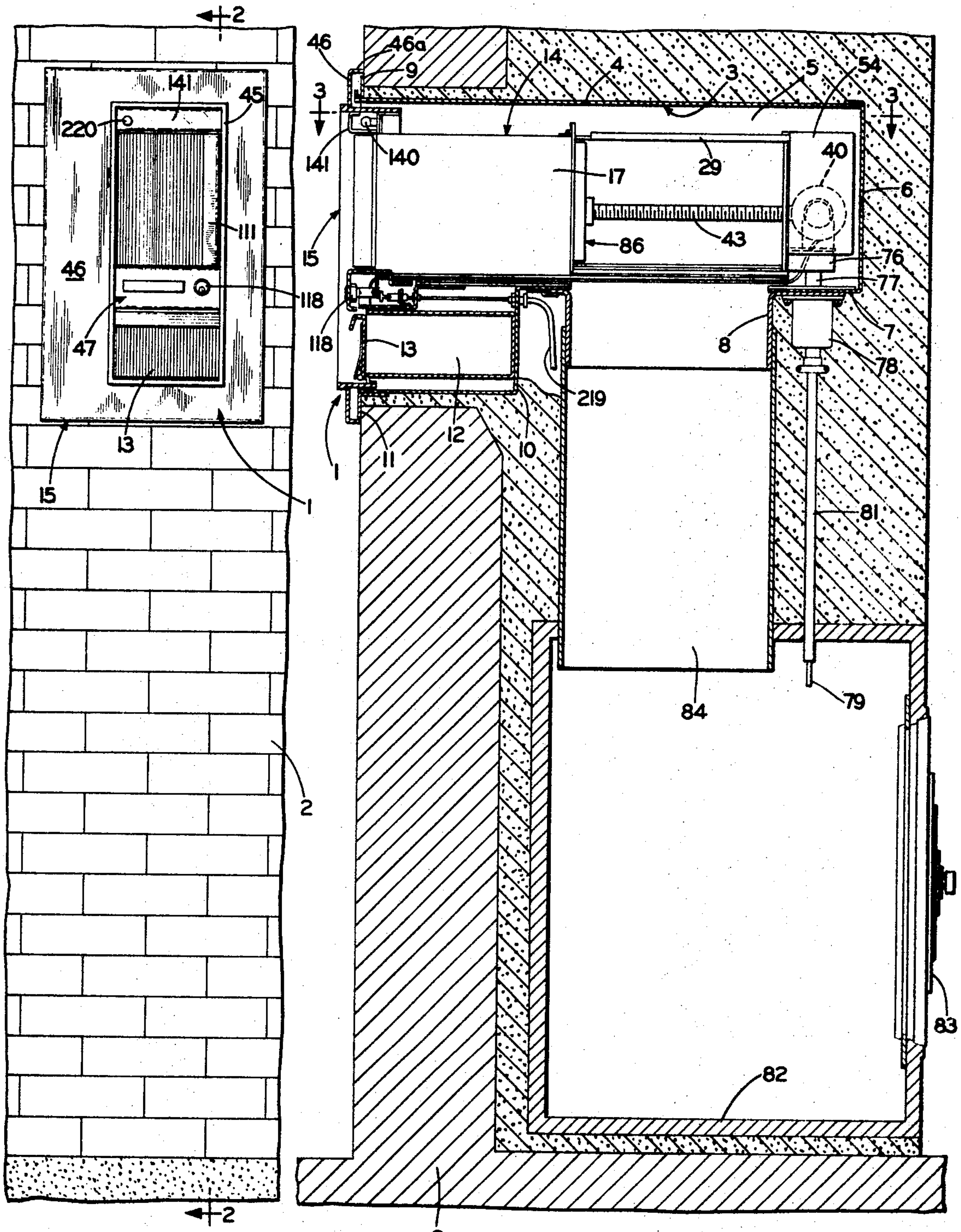
FIG. 1 is a fragmentary side view of a building wall with the improved after-hour bank depository installed therein.
FIG. 2 is a section taken on the line 2—2, FIG. 1.

An outer housing sleeve 3 is installed permanently in the wall. Housing sleeve 3 has a top wall 4, side walls 5, a rear wall 6, and a bottom wall 7. A flanged chute sleeve 8 which may be rectangular in cross section is secured in any suitable manner to sleeve bottom wall 7 near the rear end thereof, the bottom wall having a rectangular opening matching the sleeve opening above sleeve 8. A trim flange 9 surrounds the top and side walls of sleeve 3 and is permanently installed against the outer face of building wall 2 (FIG. 2). A compartment is formed by housing member 10 which is secured to the front end of sleeve 3 within building wall 2 (FIG. 2); and housing 10 has a trim flange 11 along its bottom wall installed flush with the outer face of building wall 2. A box 12 is mounted within housing 10 having a door 13 pivoted to the open end thereof. Empty depository envelopes may be stored in box 12 accessible to a customer by opening door 13.

Main housing and front frame assembly

The main depository housing is generally indicated at 14 in FIGS. 2, 3, 4, and 25 and the front frame assembly is indicated at 15.

Housing 14 includes L-shaped bottom wall 16, short side wall 17, L-shaped top wall 18, long side wall 19, and rear wall 20 at the rear end of side wall 19 and the long legs of L-shaped bottom and top walls 16 and 18. The lower longitudinal edges of side walls 17 and 19 preferably terminate in inturned flanges 21 and 22 spaced below bottom wall 16 (FIGS. 12 and 13), and heavy reinforcing and protective plates 23 and 24 are assembled, respectively, between flanges 21 and 22 and bottom wall 16. An L-shaped mounting bracket 25 extends along the outer front end of top wall 18, another angular mounting bracket 26 extends crosswise of the upper face of top wall 18, another ear bracket 27 spaced rearwardly of bracket 26 projects from the top of wall 18, and a hinge 28 is mounted on the top wall of the rear end of the short portion of top wall 18. An upturned flange 29 is formed along the long leg portion of top wall 18 beyond the rear of short portion of wall 18.

A series of reinforcing and spacer strips 30, 31, 23, and 33 spaced from each other are mounted on the upper inside face of bottom housing wall 16 extending substantially throughout the extent of the various portions of wall 16 from front to rear. The spacing of members 30–33 forms a series of longitudinally extending grooves or recesses 34, 35, 36, and 37, the purpose of which is later described.

A bracket 39 is mounted on the rear face of rear housing wall 20 and a motor 40 for driving the depository is mounted on bracket 39. Motor 40 has a bevel drive pinion 41 which meshes with bevel drive gear 42 mounted on the rear end of screw drive shaft 43 which is journaled in bearing 44 carried by rear wall 20.

Figures 4, 18, 19:
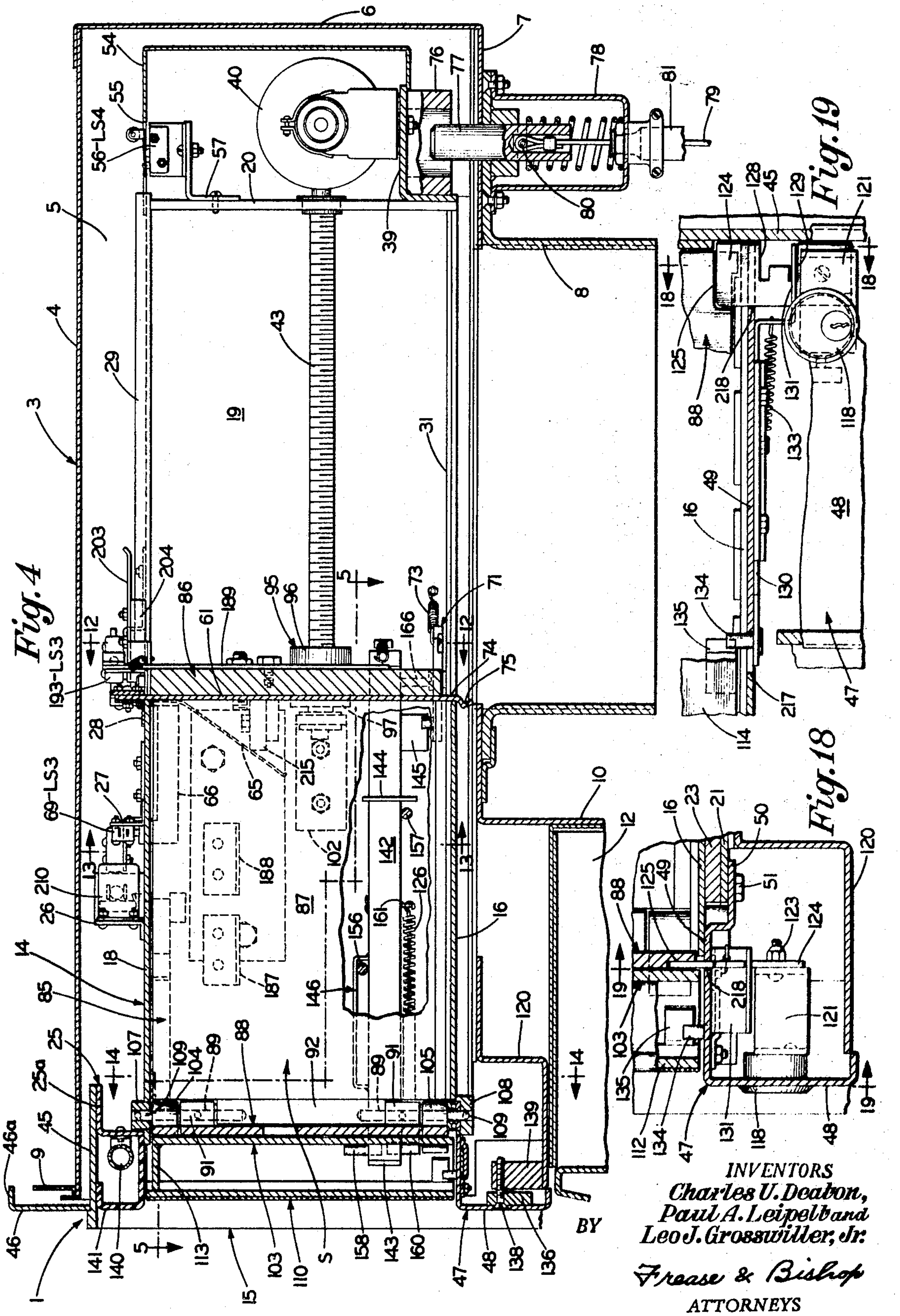
FIG. 4 is a vertical sectional view looking in the direction of the arrows 4—4, FIG. 3.
FIG. 18 is a fragmentary sectional view illustrating the lock for the depository door means looking in the direction of the arrows 18—18, FIG. 19.
FIG. 19 is a fragmentary sectional view with parts broken away looking in the direction of the arrows 19—19, FIG. 18.
Figure 10:
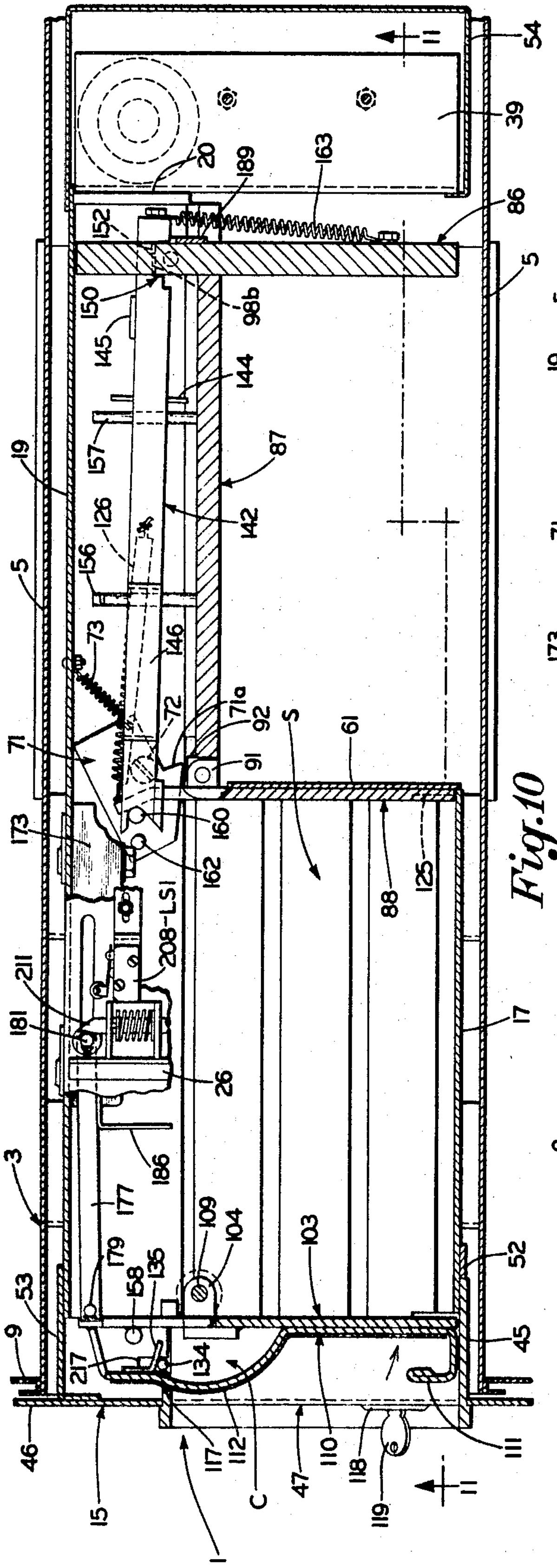
FIG. 10 is a view similar to FIG. 9 but showing the truck-like security chamber moved to depositing position to permit the bag to drop into the chute leading to the chest, taken on the line 10—10, FIG. 11.
Figure 9:
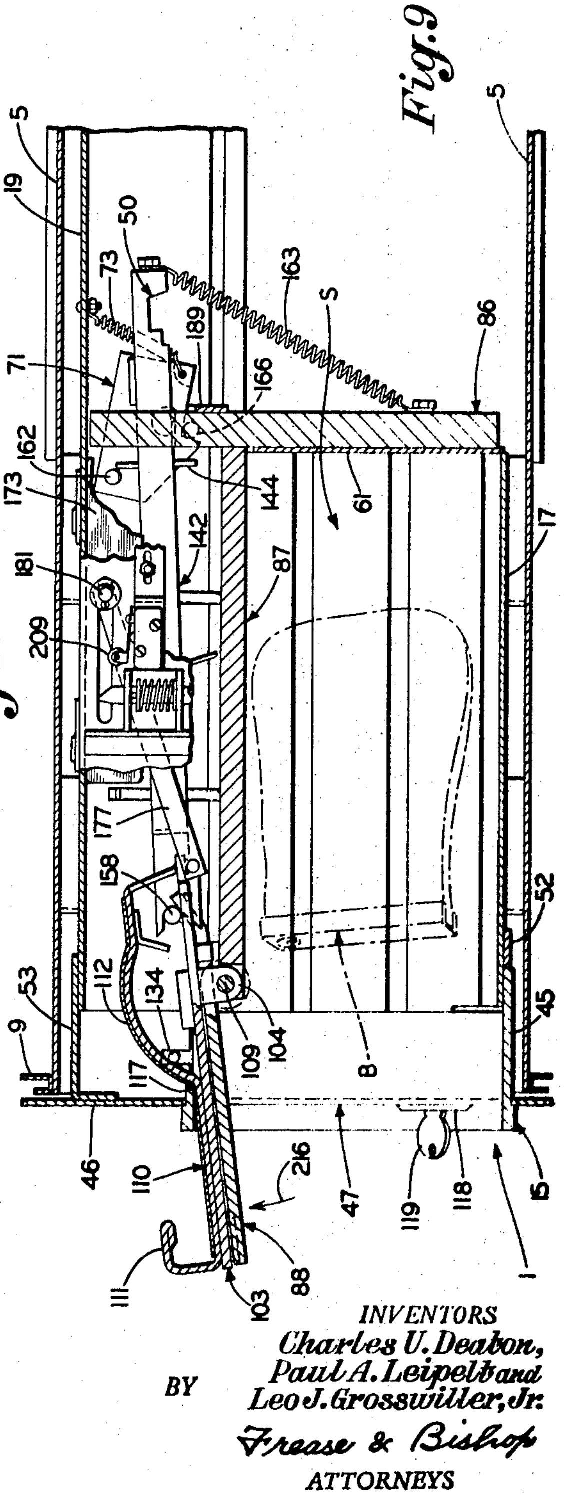
FIG. 9 is a sectional view also taken as on the line 5—5, FIG. 4, showing both doors open for inserting a bag deposit into the security chamber.

The front frame assembly 15 (FIG. 24) includes a rectangular sleeve member 45 and a surrounding trim flange member 46. Main housing 14 and frame 15 are assembled together by telescoping the front end of housing 14 within the upper portion of sleeve 45. The top flange **25*a* of mounting bracket 25 may be welded or otherwise secured to sleeve 45 (FIG. 4). A front tie channel member 47 is mounted within sleeve 45 (FIG. 24) having a vertical portion 48 and an upper rearwardly directed angular portion 49 terminating in an offset flange 50. Offset flange 50 is bolted at 51 (FIG. 18) to inturned housing flange 21. A vertical strip 52 on housing side wall 17 engages the rear edge of one of the vertical portions of sleeve 45 (FIG. 10); and a vertical angle bracket 53 extending rearwardly from trim member 46 telescopes over the front end of housing side wall 19 (FIG. 10). When the assembly of housing 14 and frame 15 is mounted in the building wall 2, as shown in FIGS. 1 and 2, the rearwardly directed flange 46*a* of trim member 46 seats against the outer face of building wall 2**.

Figure 3:
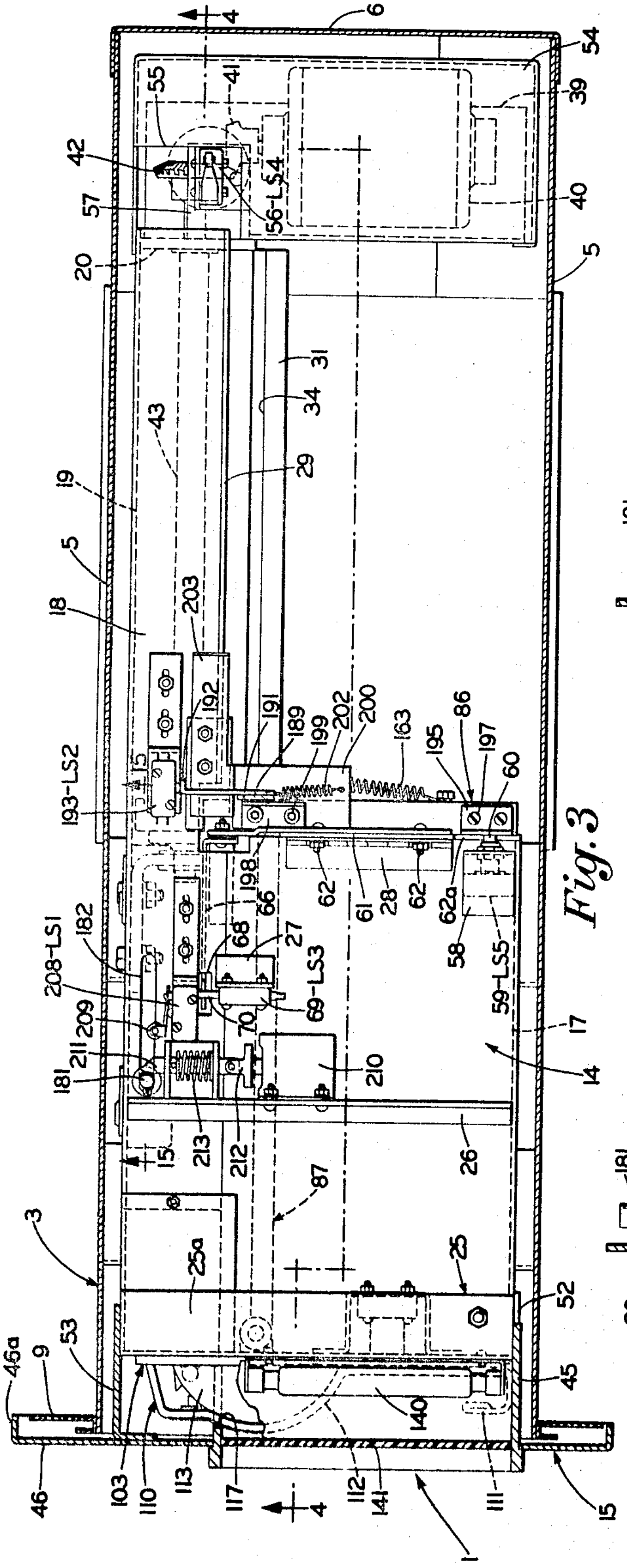
FIG. 3 is an enlarged top plan sectional view taken on the line 3—3, FIG. 2.
Figure 11:
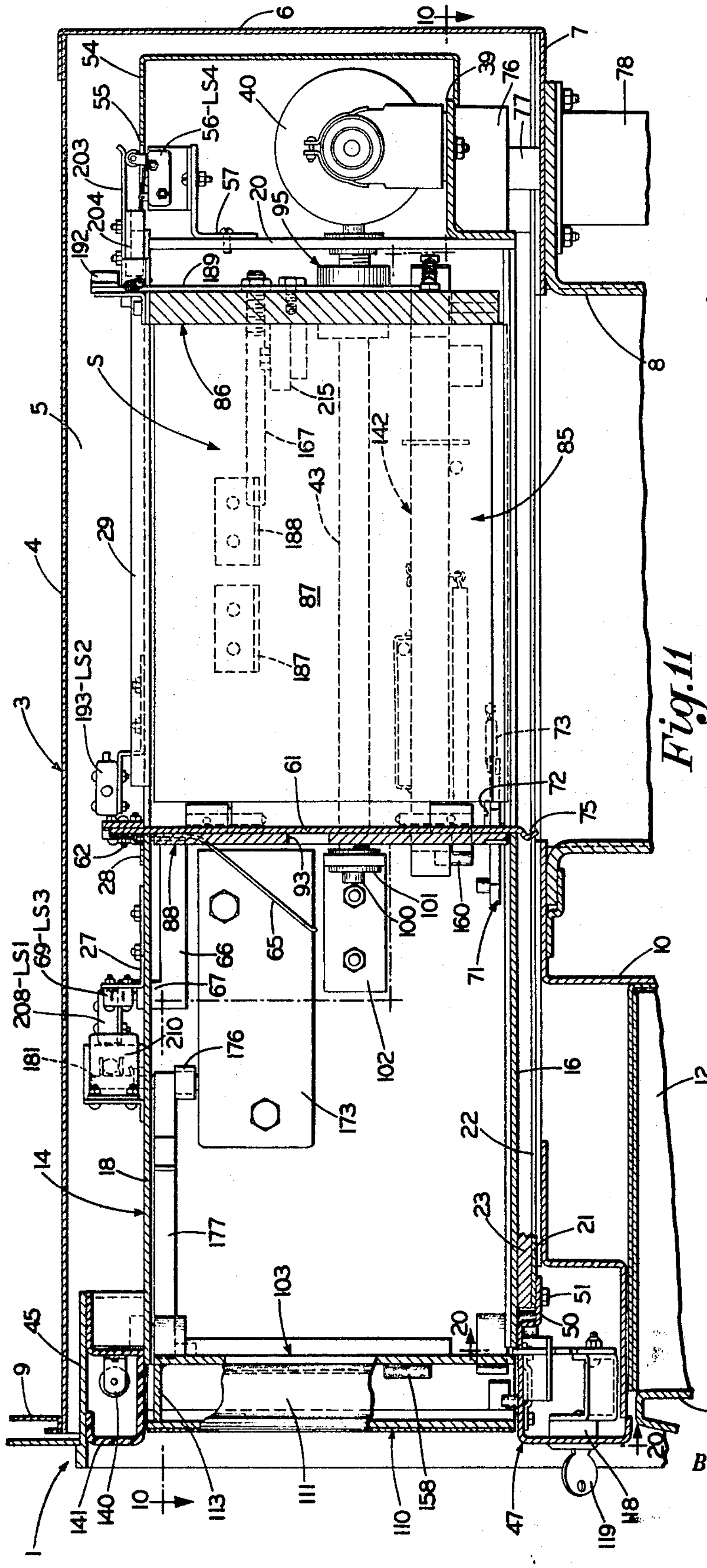
FIG. 11 is a sectional view of the parts shown in FIG. 10 in the position of FIG. 10 taken on the line 11—11, FIG. 10.

An enclosure 54 is mounted on bracket 39 and on the rear end of the housing 14 to cover motor 40 and parts driven thereby (FIGS. 2, 3 and 11). The top wall of enclosure 54 is notched out at 55 so that a microswitch 56–LS4 mounted on a bracket 57 in turn mounted on rear housing wall 20 can project above enclosure 54 to a position where it may be actuated during operation of the equipment (FIGS. 3 and 11).

A bracket 58 is mounted on the top rear corner of the short portion of housing wall 18 (FIGS. 3, 12, 13, and 25) on which a microswitch 59–LS5 is mounted, switch 59 having a rearwardly projecting switch actuator 60 (FIG. 3).

Figure 13:
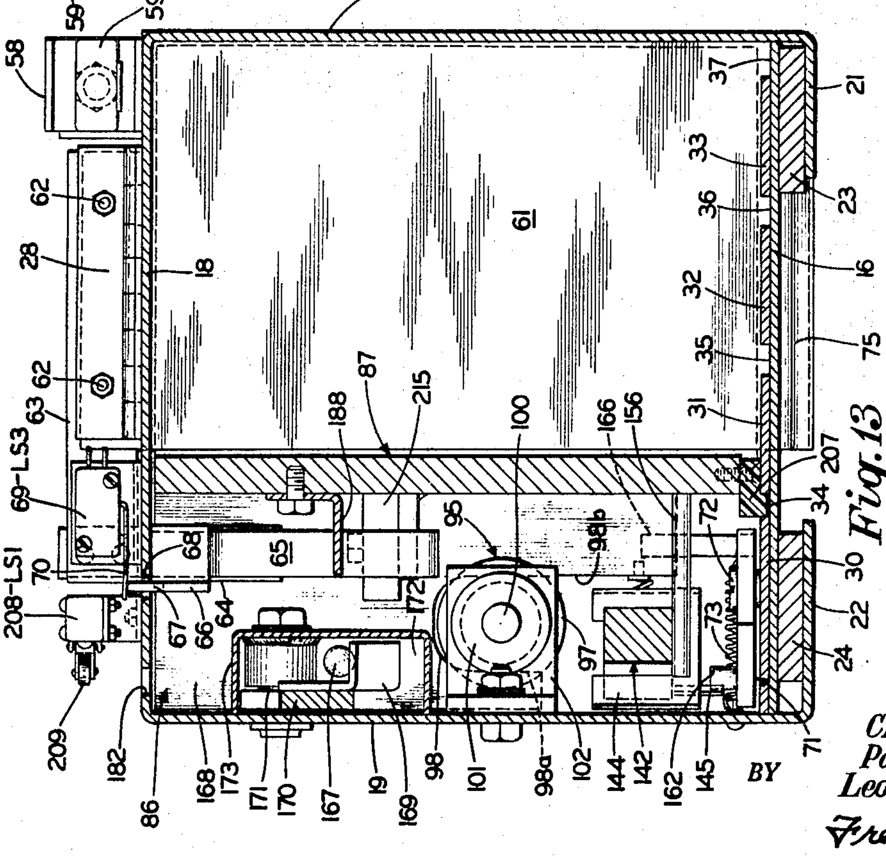
FIG. 13 is a sectional view looking in the direction of the arrows 13—13, FIG. 4.

A sensing door 61 (FIG. 26) is mounted by bolts 62 on hinge 28 at the rear end of the short portion of top wall 18. A lateral arm 63 is mounted at the top end of sensing door 61 and an ear 64 extends downward from the outer end of arm 63. An angular spring arm 65 extends downwardly forwardly from ear 64. An L-shaped switch arm 66 is fixed to ear 64 and extends forwardly of sensing door 61. Switch arm 66 has an upwardly extending actuating ear 67 at its forward end which extends upwardly through a slot 68 formed in housing top wall 18 (FIG. 25) when sensing door 61 is in normal position as shown in FIG. 4. Switch arm 66 and its actuating ear 67 are adapted to actuate microswitch 69–LS3 mounted on bracket 27 by engagement of actuating ear 67 with blade 70 of switch 69 (FIG. 13).

Figure 12:
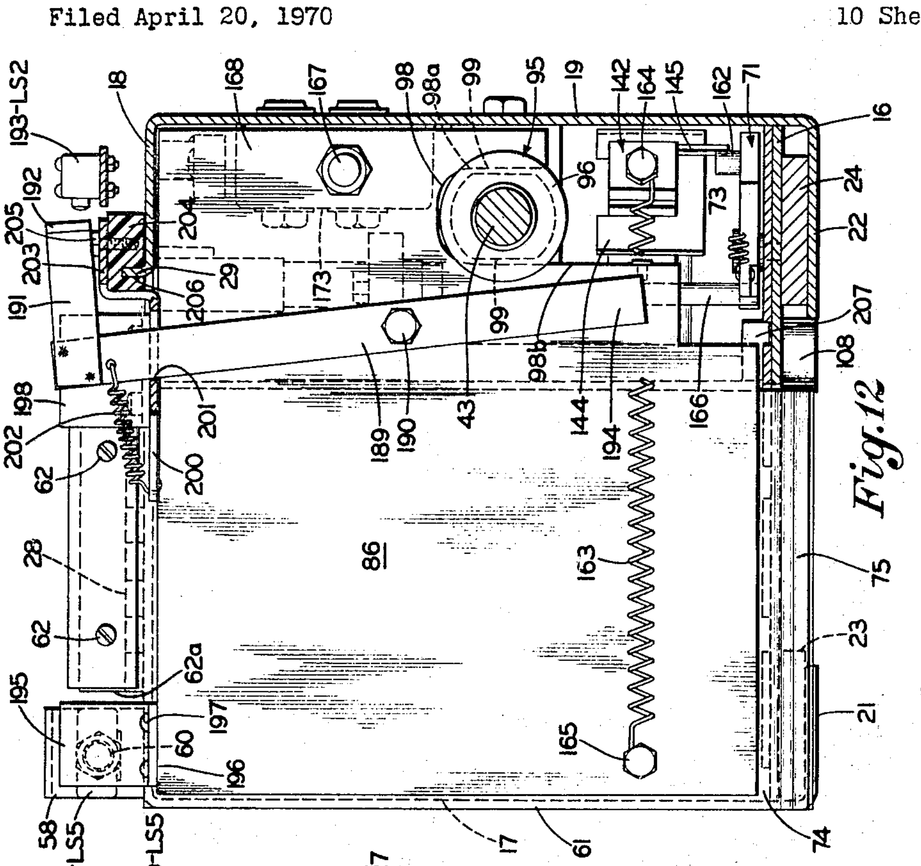
FIG. 12 is a sectional view looking in the direction of the arrows 12—12, FIG. 4.
Figure 17:
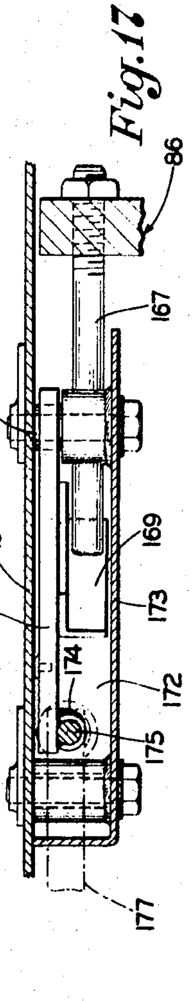
FIG. 17 is a fragmentary sectional view looking in the direction of the arrows 17—17, FIG. 16.

Sensing door 61 has a lower end 74 formed with a groove formation 75. The lower door end 74, when door 61 is in normal position, extends below the rear end of housing bottom wall 16 (FIGS. 11 and 12). Door 61 also is cut out at **62*a* at its upper corner to provide clearance for switch 59**.

A cam plate 71 (FIG. 27) is pivotally mounted at 72 on bottom housing wall 16 about midway between the front and rear ends thereof (FIG. 10). Cam plate 71 is normally biased counterclockwise by spring 73, and cam plate 71 is shown in its normal position in FIG. 5 when the parts of the mechanism are in normal position ready to accept a deposit.

A cup-like member 76 is mounted on the underside of bracket 39, and is adapted to receive and engage a spring-pressed plunger 77 carried by cartridge 78 mounted on the flange of chute sleeve 8 (FIG. 4). Plunger 77 acts as a locking bolt to retain the depository housing 14 assembled within housing sleeve 3 and within the building wall 2 so as to prevent removal of the entire mechanism from the exterior of the wall except when plunger bolt 77 is released. A release pull cable 79 attached to bolt 77 at 80 extends through tube 81 (FIG. 2) into the receiving chest or safe 82 located in building wall 2 and having a safe door 83 accessible within the building.

Preferably a vertical chute 84 communicates between the chest 82 and chute sleeve 8. One size of chest is shown in FIG. 2 but such receiving chest 82 may be of any desired size having a height greater than that shown in FIG. 2 into which the vertical chute 84 discharges. Pull cable 79 is only accessible from within chest 82. Thus, the chest must be opened in order to move cable 79 to release plunger bolt 77 from cup 76 and to thereby release the depository unit for removal from the wall.

Movable truck mechanism

Figures 28, 29:
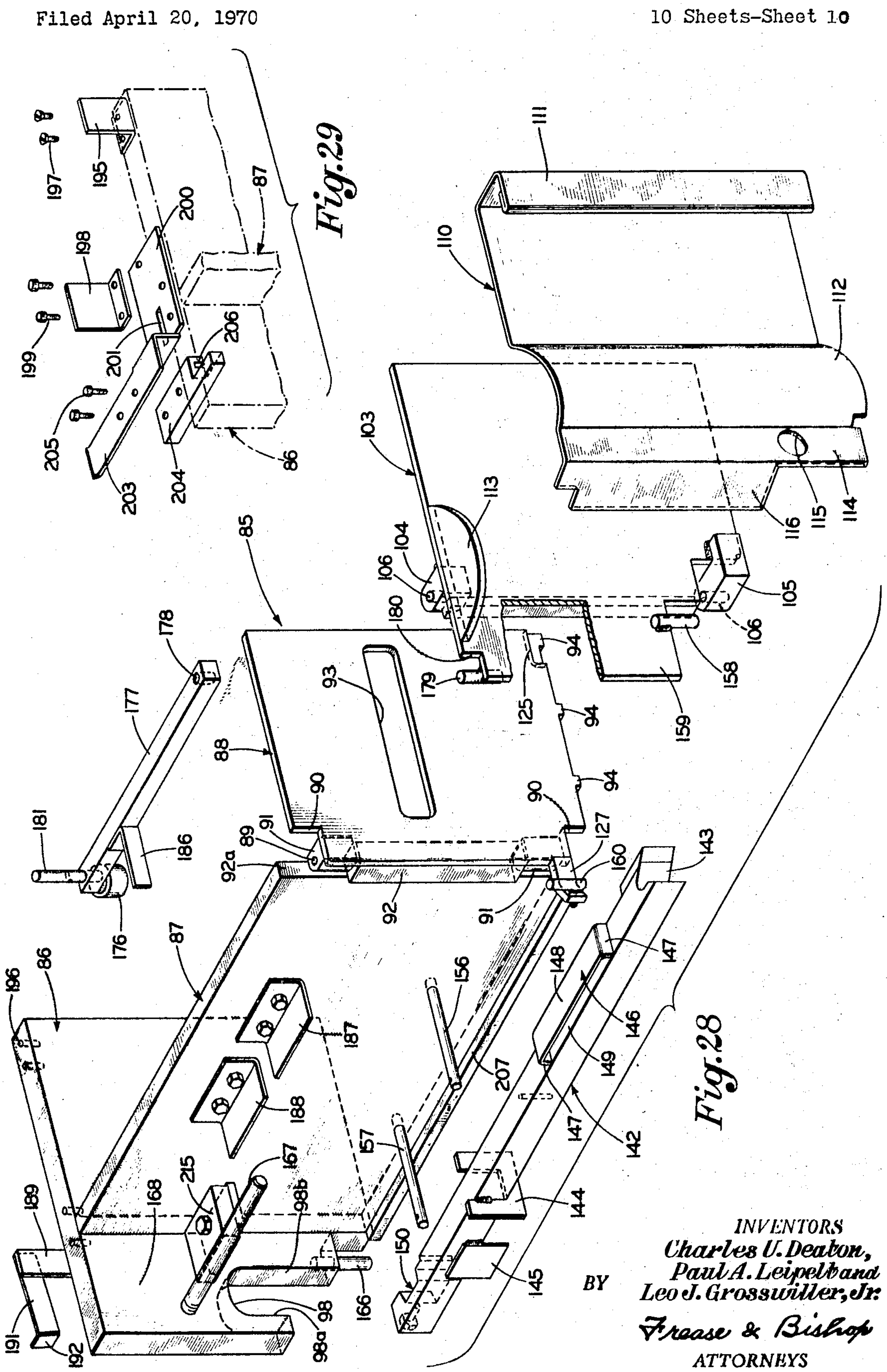
FIG. 28 is an exploded perspective view of the truck-like security chamber protective walls and mechanisms cooperating therewith.
FIG. 29 is an exploded perspective view of the guide elements mounted on parts of the members shown in FIG. 28.

The depository mechanism also includes a movable truck mechanism generally indicated at 85, the major components of which are best shown in FIG. 28. Truck 85 along with main housing 14 form a movable security chamber S for transferring deposits from a secure location within the unit to discharge the same over chute sleeve 8.

Figures 5, 6, 7, 8:
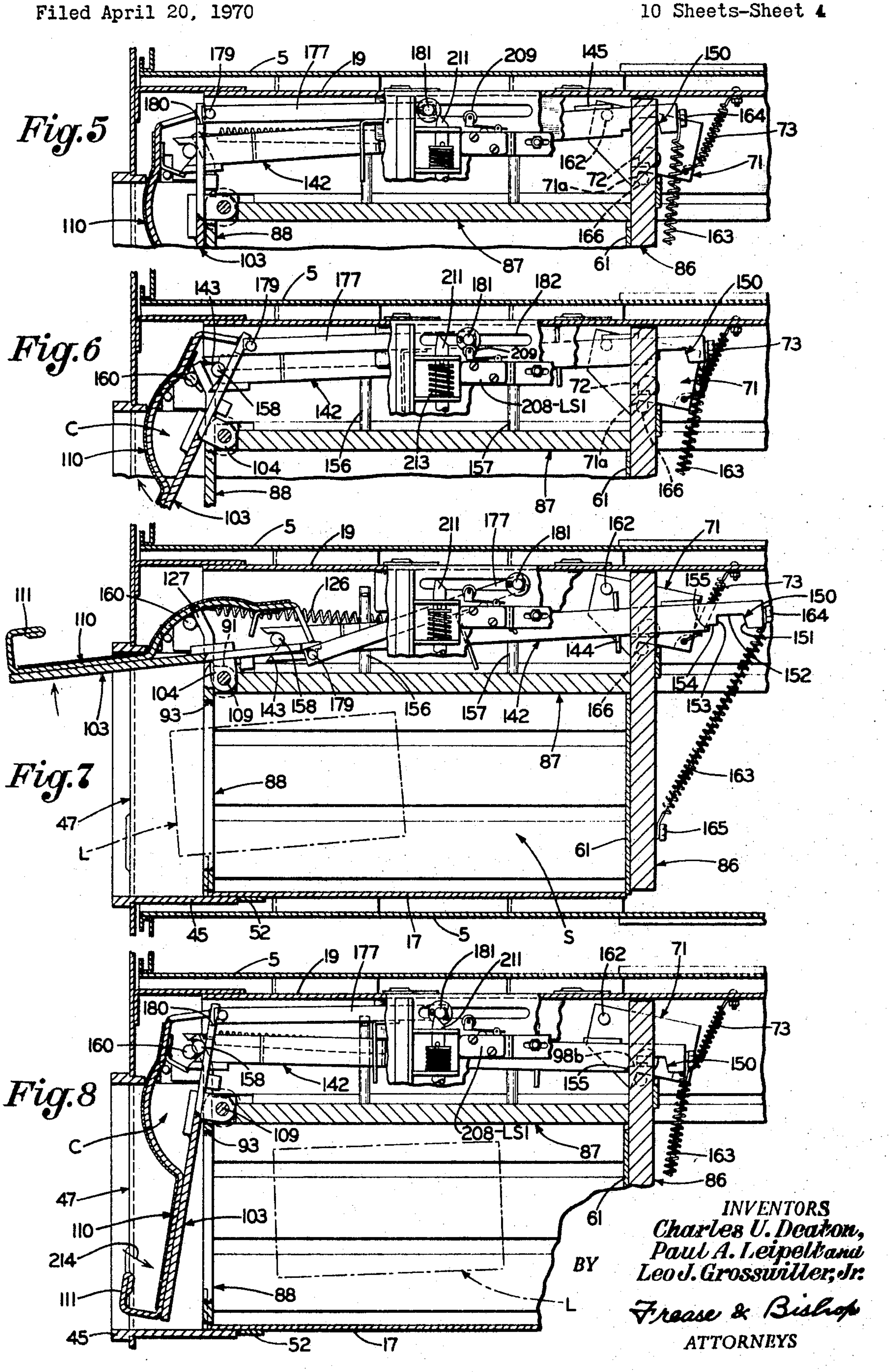
FIGS. 5, 6, 7, and 8 are similar fragmentary sectional views showing various stages of operation in depositing a letter in the improved depository taken on the line 5—5, FIG. 4.

Truck 85 includes as basic components a security cross wall 86, a security longitudinal wall 87, and a main security door 88. Door 88 is hinged on pin 89. Cross wall 86 in normal deposit accepting position is located within and extends crosswise of housing 14 approximately midway between the ends thereof (FIGS. 4 and 5). Longitudinal wall 87 is secured to wall 86 at right angles thereto and extends forwardly (to the left) in FIGS. 4 and 5 from wall 86 spaced laterally between the side walls 17 and 19 of housing 1. Main door 88 is notched at 90 at the top and bottom corners of the hinge side edge, and has hinge ears 91 projecting rearward to receive hinge pins 89 which are mounted on hinge block 92 that projects from the front vertical edge 92*a* of the longitudinal wall 27.

Door 88 has an envelope slot 93 formed therein, and the lower end of door 88 has tongues 94 projecting downward and spaced apart to engage and slide in bottom wall grooves 34, 35 and 36 for a purpose to be described.

A drive nut 95 is threaded on drive shaft 43 having flanges 96 and 97 engaging the rear and front faces of wall 86 within cutout portion 98. Nut 95 has squared portions 99 engaged with the straight sides 98*a* and 98*b* of cutout 98 so that rotation of drive shaft 43 causes the nut to move longitudinally in one direction or another along drive shaft 43 to thereby move wall 86 lengthwise in one direction or another within housing 14. The forward end 100 of drive shaft 43 is journaled in bearing 101 carried by bracket 102 (FIG. 11) mounted on the side wall 19 of housing 14.

Thus, rotation of shaft 43 in one direction or the other by motor 40 can move the truck composed of members 86, 87 and 88 from the deposit accepting position of FIG. 4 to the deposit discharging position of FIG. 11. During such movement, main door 88 is maintained in closed position by the ears 94 engaged in the grooves 34, 35 and 36. Other mechanism to be described later, also locks the main door 88 in closed position.

The members 86, 87 and 88, when the parts are in the position of FIG. 4, form three walls of the six-sided box-like security chamber S. The other three sides of chamber S are formed by housing walls 16, 17 and 18. When main door 88 is locked, security chamber S is inaccessible except through envelope slot 93 in door 88. As security chamber S moves from the position of FIG. 4 to that of FIG. 11, communication is established between it and chute sleeve 8 so that any material to be deposited contained in security chamber S drops by gravity from chamber S into the receiving chest 82.

Figures 24, 25, 26, 27:
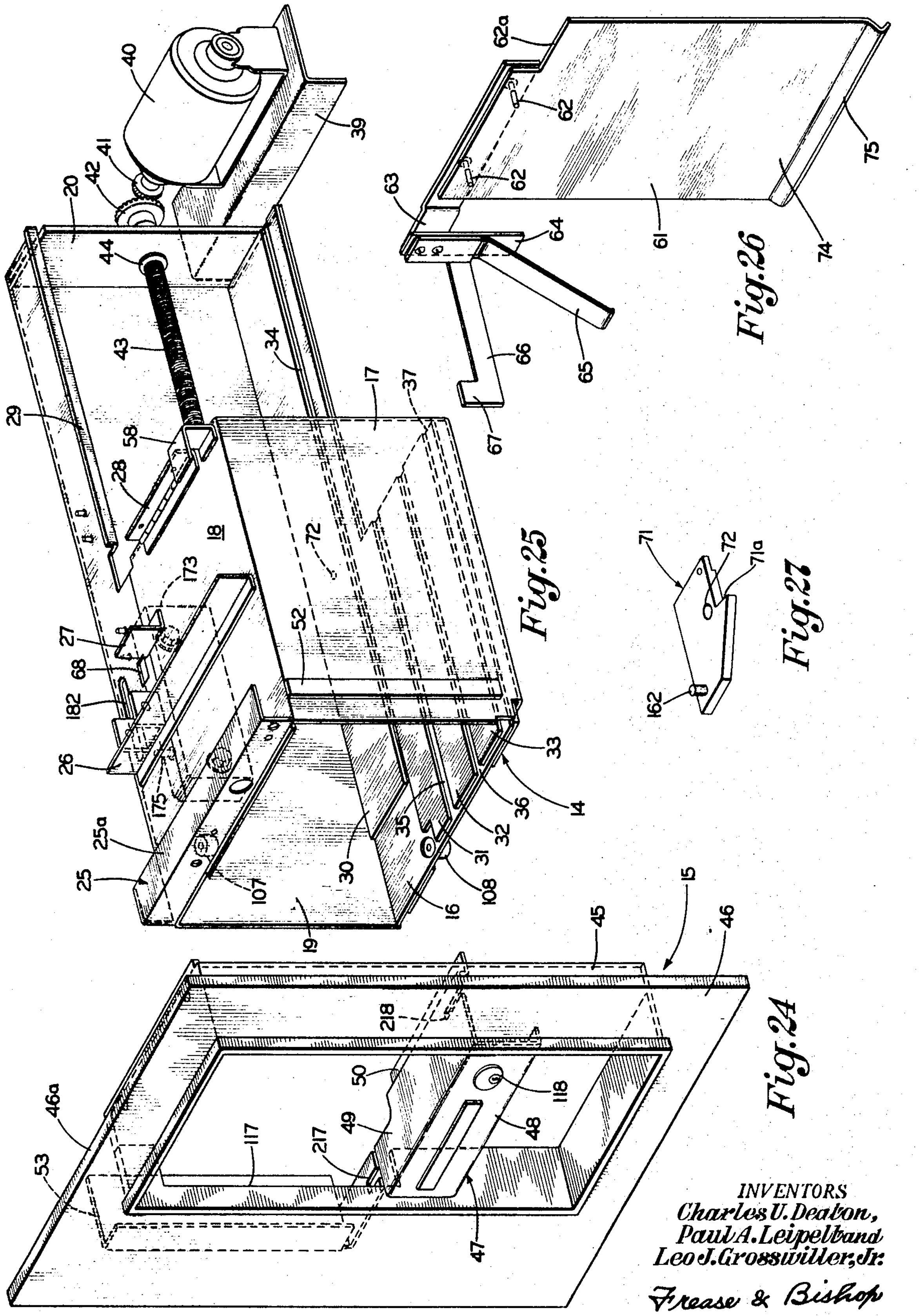
FIG. 24 is a perspective view of the front frame assembly of the depository.
FIG. 25 is a perspective view of the depository housing and drive mechanism.
FIG. 26 is a perspective view of the sensing door detached from the housing on which it is mounted.
FIG. 27 is a perspective view of a latch member detached from the mechanism.

A secondary door generally indicated at 103 (FIG. 28) is associated with main door 88 so as to open and close along with main door 88 or to open and close separately from main door 88 to uncover envelope slot 93. Door 103 has upper and lower hinge ears 104 and 105 with hinge pin receiving holes 106. The other hinge elements are indicated by bosses 107 and 108, respectively, mounted on upper wall 18 and lower wall 16 of main housing 14 (FIGS. 4 and 25). Hinge pins 109 are carried by bosses 107 and 108 and extend downward and upward, respectively, into hinge openings 106 in upper and lower hinge ears 104 and 105 of secondary door 103. Secondary door hinge pins 109 are aligned axially with main door hinge pins 89.

Thus, doors 88 and 103 may open and close together as a unit since their hinge axes coincide. However, door 88 is mounted on and movable with truck mechanism 85 while door 103 is pivotally mounted on fixed housing 14, and thus the two doors 88 and 103 may be separated. Also door 103 may be opened independently of door 88, but door 88 can only be opened along with door 103.

A combined cover, housing and handle member generally indicated at 110 is fixed to the front of secondary door 103 so as to prevent a handle portion 111 and a curved housing portion 112 formed on a radius about hinge pin axis 106.

When members 110 and 103 are assembled, the top end of the curved portion 112 of member 110 is closed by a curved ear 113 at the top of door 103. Member 110 terminates in a vertical panel 114 at the left or hinge side of door 103 (FIG. 28) and is formed with an opening 115 and a rearwardly directed flange 116. Curved housing portion 112 moves arcuately through a cutout 117 in the left-hand upright leg of sleeve 45 (FIG. 24), as shown in FIGS. 5–10. Thus, a compartment C is formed by curved portion 112 between member 110 and secondary door 103 as indicated in FIG. 6. Compartment C contains various operating connections for the mechanism and the inner surface of portion 112 serves as a cam. Handle portion 111 may be grasped by the hand of the user to open and close secondary door 103.

A customer key lock 118 controlled by customer key 119 is mounted on vertical portion 48 of front tie member 47 within a compartment formed by housing member 10. Lock 118 is segregated in the upper left-hand corner of the compartment (FIG. 20) by a Z-shaped angle member 120 which extends crosswise below doors 88 and 103 (FIG. 4) and below the front end of compartment S. A channel-shaped bracket 121 is fixed to the movable cylinder of lock 118, shown in locked position in FIGS. 18 and 19 and in unlocked position in FIGS. 20 and 21. The rear leg 122 of bracket 121 is pivotally connected at 123 with slide bolt 124.

The upper end of bolt 124 in locked position extends into a recess 125 formed in the lower swinging side corner of door 88 (FIGS. 18 and 19) and thus holds door 88 closed excepting when lock 118 is unlocked by a customer. A spring 126 connected to an angular finger 127 projecting from the lower hinge side corner of door 88 normally urges door 88 to swing to open position when lock 118 is unlocked (FIGS. 4, 7, 14 and 28).

Figure 20:
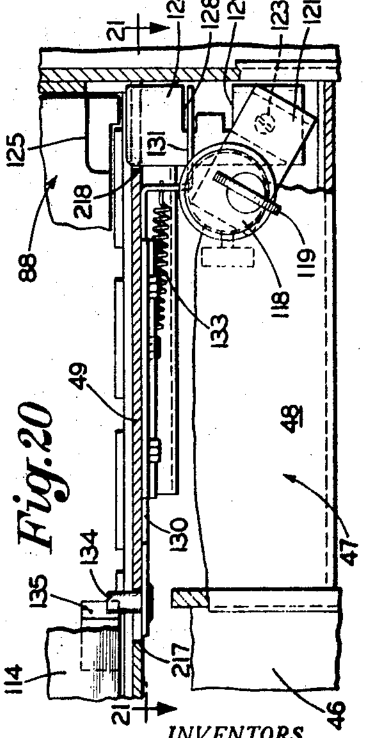
FIG. 20 is a view similar to FIG. 19 but showing the key lock in unlocked position, looking in the direction of the arrows 20—20, FIG. 11.

Lock bolt 124 has an upper notch 128 and a lower notch 129 formed in its outer edge between its upper end and its pivot connection 123 (FIG. 20). A sliding latch 130 is slidably mounted on the inside of the upper leg of channel member 47. Latch 130 has an offset end 131 formed with a rearwardly projecting ear 132. Latch 130 normally is biased by spring 133 to the left (FIG. 20) toward latching position, but is held in unlatched position by pin 134 which engages an angle clip 135 projecting from the inside of vertical flange 114 of cover 110 and within compartment C. The unlatched position of slide latch 130 is shown in full lines and its latched position is shown in dot-dash lines in FIG. 21, the latching occurring when angle clip 135 has released pin 134 upon opening secondary door 103.

Figure 21:
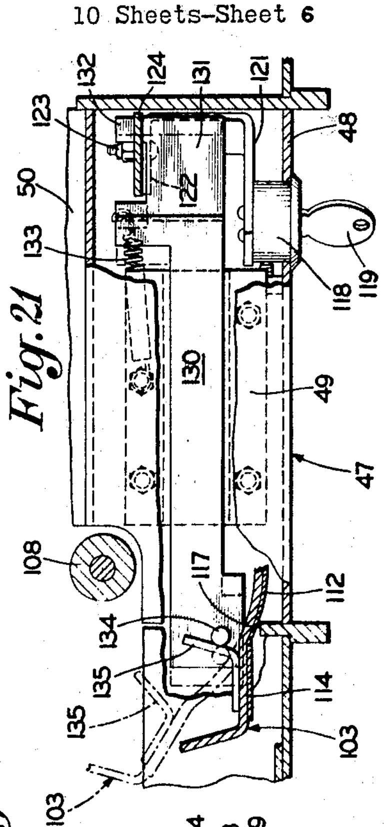
FIG. 21 is a sectional view taken on the line 21—21, FIG. 20, with the key lock illustrated in unlocked position and showing the door partially open in dot-dash lines.

Thus, when door 103 is opened from normal position (FIG. 19), slide latch 130 moves to the left and its ear 132 engages in the lower notch 129 of bolt 124 preventing lock 118 from being unlocked at any time other than when the secondary door 103 is closed. As long as the secondary door is closed, slide latch 130 is held in unlatched position as shown in FIGS. 19, 20, and 21, and lock 118 may be unlocked by a customer using his key 119. When lock 118 is unlocked, slide bolt 124 moves from locked position of FIG. 19 to unlocked position of FIG. 20. Upon subsequent opening of secondary door 103, slide latch 130 moves to the left (FIG. 20) and its ear 132 engages in upper notch 128 of bolt 124 holding the bolt in unlocked position so long as the secondary door 103 is open. At the same time, with bolt 124 in the unlocked position (FIG. 20), spring 126 urges main door 88 to swing open whenever secondary door 103 is opened by a customer pulling on handle 111.

The chamber formed by the angle member 120 in which the lock 118, bolt 124 and slide latch 130 are located, has (FIGS. 4 and 14) a plate 136 preferably welded at 137 to the inner face of channel member 47 and plate 136 in turn is bolted at 138 to a heavy bar 139 secured to the lower flange of Z-member 120. This provides means for bolting the members 46 and 47 to the main housing 14 to enclose lock 118 and related mechanisms.

Referring to FIGS. 1, 2, 3, and 11, the space below the upper rail of frame sleeve 45 and the upper ends of doors 88 and 103 may be used to mount a lighting fixture 140 enclosed by a light diffusing cover 141.

Main lock and control bar

The mechanism is provided with a main locking control bar generally indicated at 142, the construction, per se, of which is best shown in FIG. 28. Bar 142 has a vertical notch 143 in its front end, a U-shaped shield 144 surrounding the bottom and two sides of the bar intermediate the ends of the bar, a cam plate operating ear 145 between shield 144 and the rear end of bar 142, and a U-shaped keeper 146 with flanges 147 and a base 148 spaced from the upper surface of bar 142 providing an elongated slot 149. A stepped-cam-notch 150 is formed in the inside face of bar 142 adjacent its rear end. Looking at the top of cam-notch 150 in FIG. 7, its shape includes a tapered wall 151, a flat wall 152 parallel with the side surfaces of bar 142, a shoulder surface 153 perpendicular to surface 152, a shallower notch surface 154 parallel with surface 152 and a secondary shoulder surface 155 parallel with surface 153.

Bar 142 is suspended from the longitudinal security wall 87 by forward pin 156 (FIG. 28) which is received in and extends through slot 149 so that keeper 146 supports the front end of the bar on pin 156 but permits longitudinal movement of bar 142 back and forth relative to wall 87, as well as some lateral movement of bar 142 toward and away from wall 87. Bar 142 also is supported on pin 157 which engages the undersurface of bar 142 preventing the bar from rotating counterclockwise about pin 156, viewing FIG. 28.

Referring to FIG. 4, the manner in which bar 142 is suspended and supported by pins 156 and 157 is illustrated with bar 142 at its normal forward position with the depository components in normal position ready to receive a deposit. At this time, pin 156 is at the rear end of slot 149 formed by keeper 146, and pin 157 is located just in front of shield 144.

The notch 143 at the front end of bar 142 is always pivotally engaged with pin 158 which projects downward from the wing-like extension 159 of door 103 and extends to the left (FIG. 28) of the hinge axis (holes 106) of door 103. Engagement of the lower end of pin 158 in notch 143 at the front end of bar 142 is well shown in FIGS. 4 and 14. Bar notch 143 sometimes engages the upper end of pin 160 which projects upward from finger 127 on door 88 (FIGS. 6 and 28). The engagement of notch 143 with the upper end of pin 160 is well shown in FIGS. 4 and 14. Spring 126, the front end of which is connected to finger 127, is connected at 161 at its rear end to bar 142 normally urging the bar forward to maintain engagement with pins 158 and 160 (FIG. 4).

Referring to FIG. 5, bar 142 in normal deposit accepting position of the depository components has its operating ear 145 engaged with pin 162 which projects upward from cam plate 71 holding the rear end of bar 142 away from the edge **98*b* of cutout 98 in wall 86 (FIG. 28). The rear end of bar 142 is urged to maintain ear 145 engaged with cam pin 162 (FIG. 5) by spring 163 which is connected to the rear end of bar 142 by bolts 164. The other end of spring 163 is connected by bolt 165 to the rear face of wall 86** (FIGS. 7 and 12).

Miscellaneous actuators

An actuating pin 166 projects downward from the lower edge of the wall 86 to the left of wall 87 (FIG. 28) and is adapted to engage and actuate cam plate 71 during movement of the truck 85. An elongated pin 167 projects forwardly from wing portion 168 of wall 86 above cutout 98, and in the normal deposit accepting position of the depository, pin 167 engages angle 169 mounted on lever 170 which is pivoted at 171 to wall 19 within a compartment 172 formed by rectangular box-like housing 173 mounted on the upper inside forward surface of housing side wall 19 (FIG. 15).

Figure 16:
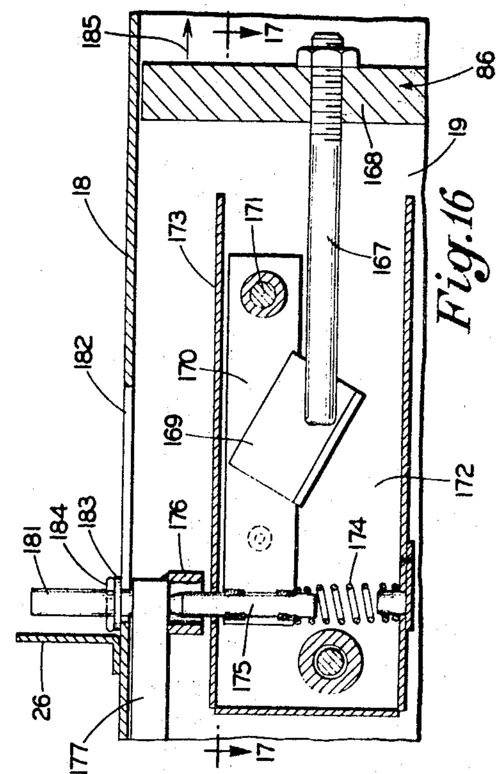
FIG. 16 is a view similar to FIG. 15 illustrating the parts in FIG. 15 moved to locking position after the automatic operation of the depository has commenced.
Figure 15:
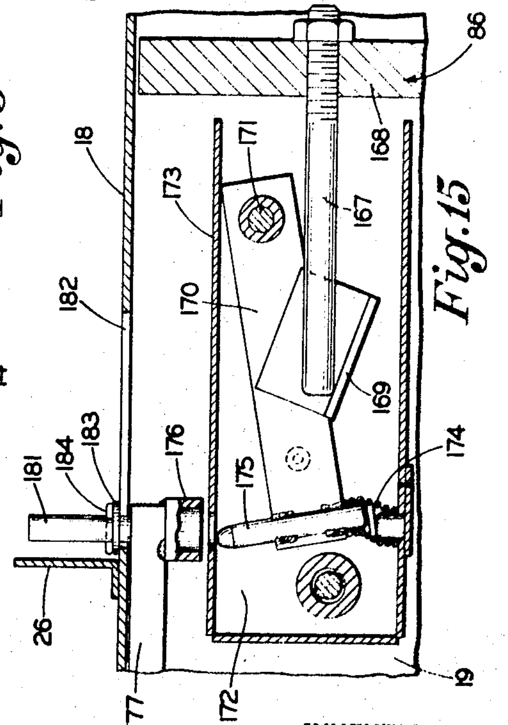
FIG. 15 is a fragmentary sectional view looking in the direction of the arrows 15—15, FIG. 3, illustrating one of the deadlock mechanisms in normal or unlocked position when the depository is in condition to receive a deposit.

When in the normal position of FIG. 15, lever 170 is held down against the pressure of spring 174, and the free end of lever 170 disengages bolt 175 from lock cup 176 mounted on the underside of the rear end of actuator bar 177. The front end of bar 177 is pivotally connected at 178 to pivot pin 179 mounted at the upper left-hand notched out corner 180 of wing extension 159 of door 103 (FIG. 28). The rear end of bar 177 is provided with a pin 181 which projects upwardly through a slot 182 formed in top housing wall 18 (FIGS. 3, 15, and 16). Bar 177 is held in sliding engagement with top wall 18 by washer 183 engaged by cotter pin 184 with pin 181.

As truck 85 moves toward deposit discharging position, indicated by the arrow 185 in FIG. 16 illustrating movement of wall 86, actuator pin 167 releases angle 169 permitting lever 170 to move upward so that bolt 175 engages in cup 176 to hold bar 177 against movement (FIG. 16).

A security angle 186 is mounted on bar 177 (FIG. 10) projecting inwardly between bar 177 and wall 87 to prevent surreptitious probing from the front of the depository by a probe seeking to gain access to pin 181, cup 176, and the devices actuated thereby.

A pair of front and rear angle actuators 187 and 188 are mounted on the outer surface of longitudinal security wall 87 (FIGS. 4, 11, 13, 22, 23, and 28) to control movement of the sensing door 61 in a manner to be described later. A lever 189 is pivotally mounted intermediate its ends at 190 on the rear face of wall 86 (FIGS. 12 and 28). The upper end of lever 189 has a laterally extending finger 191 terminating in an actuator ear 192 which is adapted to engage and operate microswitch 193–LS2. The lower end 194 of lever 189 (FIG. 12) is located so as to be engaged by the rear end of control bar 142 in one position of movement of control bar 142 (see FIG. 10).

An angled actuator ear 195 is mounted at 196 by screws 197 at a top corner of wall 86, ear 195 being adapted to engage switch actuator 60 (FIG. 3) when truck 85 is in normal deposit accepting position. An ear 198 also is mounted on the upper edge of wall 86 by screws 199 to form a backup for the upper end of lever 189 during movement of the lever. Bracket 200 also is mounted on the upper edge of wall 86 between ear 198 and wall 86. A slot 201 is formed in bracket 200 through which the upper end of lever 189 projects (FIG. 12). A spring 202 is connected with bracket 200 and the upper end of lever 189, normally biasing lever 189 counterclockwise (FIG. 12).

An angular offset extension 203 is formed on bracket 200 on which a nylon glide block 204 is mounted by screws 205. Glide block 204 has a groove 206 which receives the upturned flange 29 on top housing wall 18. Glide block 204 provides glide means supporting truck 85 for its movement between the position of FIG. 4 and that of FIGS. 10 and 11. The lower edge of longitudinal security wall 87 housing has an elongated nylon glide member 207 secured thereto (FIGS. 13 and 28) having a projection which rides in groove 34 formed in the housing bottom wall 16 by strips 30 and 31.

A microswitch 208 (FIGS. 3, 11 and 13) is mounted on top housing wall 18 adjacent slot 182 having a switch finger 209 adapted to be actuated by pin 181 as the latter moves along slot 182. A solenoid 210 is mounted on bracket 26 above housing wall 18. Latch 211 is actuated by the solenoid armature 212, latch 211 normally being spring-pressed upward viewing FIG. 3 by spring 213 so that the beveled end of latch 211 is in the path of movement of pin 181, holding pin 181 against movement in the normal deposit accepting position of the depository shown in FIG. 3 with the equipment deenergized.

OPERATIONAL PROCEDURES

In general

The fundamental concept of the invention involves using the movable truck 85 to form a generally rectangular or box-like security chamber S into which either an envelope-type or bag-type deposit is placed when the security chamber is in one position and then moving the chamber bodily to a second position where the deposited material drops into a receiving chest or safe.

The security chamber S of truck 85 is formed by housing bottom wall 16, housing side wall 17, housing top wall 18, longitudinal security wall 87, security crosswall 86, and main security door 88 and secondary door 103.

The outer or secondary door 103 is opened on its hinges merely by grasping handle 111 to expose main door 88 which has envelope slot 93 therein through which an envelope-type deposit may be inserted into security chamber S.

When a bag-type deposit is to be made, the customer key 119 is used to unlock 118 whereupon doors 88 and 103 open together by grasping handle 111 to expose security chamber S for placing a bag deposit therein.

The closing of secondary door 103 by the customer following the operation of depositing an envelope-type deposit through slot 93, or the closing of doors 88 and 103 in unison by the customer following the operation of making a bag-type deposit, automatically initiates operation of the unit to move the truck 85 and security chamber S bodily from its deposit-receiving location at the front end of main housing 14 (FIG. 4) to a rearward location over chute 8 leading to chest 82.

Thereafter, providing that everything has dropped from the security chamber S at least into chute 8, the security chamber S moves bodily back to its deposit-receiving position. Upon arrival, secondary door 103 is unlocked so that the depository 1 is restored to a condition ready to receive another deposit.

Operation when an envelope is deposited

A customer desiring to make an envelope-type deposit approaches the unit as shown in FIGS. 1 and 2, grasps the handle 11 in one hand and pulls secondary door 103 toward open position. Meanwhile, the unit has been set or reset to be in a condition to receive a deposit. Such resetting involves, among other matters, supplying power to energize the unit by connecting a source of power to various circuit switch, motor, and solenoid components, etc. When the equipment is energized, solenoid 210 is in energized condition and has moved latch pin 211 to a retracted position shown in FIG. 5 wherein the outer end of pin 211 is clear of the path of movement of pin 181 on actuator bar 177. Actuator bar 177 is connected by pivot hole 178 and pin 179 to door 103, that is, it is link-connected with the door.

When the components of the mechanism are in this condition, the main locking control bar 142 is in the position shown in FIG. 5, that is, unlatched with respect to controlling either of the doors 88 or 103. This condition exists because the rear end of bar 142 has its cam or latch notch 150 held out of any operative latching position by operating ear 145, which engages pin 162 on cam plate 71. At the same time the vertical notch 143 at the front end of control bar 142 engages the upper end of pin 160 on door 88 and the lower end of axially aligned pin 158 on secondary door 103.

When the customer grasps handle 111 and pulls outwardly thereon, secondary door 103 swings outwardly on its hinge mounting 104 to 109. As door 103 swings through an initial segment of its opening arc of movement, say through 10° or so, pin 181 moves (FIG. 6) along slot 182 to a position contacting finger 209 of microswitch 208–LS1. Operation of switch 208 deenergizes a circuit controlled by switch 208 in which solenoid 210 is connected and thus solenoid 210 is deenergized permitting spring 213 to move latch 211 to latching position shown in FIG. 6. Meanwhile, main control bar 142, which is spring-biased to the left (FIGS. 5 and 6) by spring 126 (FIG. 4), and the rear end of which is spring-biased downwardly (FIGS. 5–7) by spring 163, also moves to the right by continued engagement of notch 143 with the lower end of pin 158 on door 103 (FIGS. 6 and 7), during opening movement of door 103.

As bar 142 moves to the right, operating ear 145 becomes disengaged from cam plate pin 162 and the right end of bar 142 engages side **98*b* of cut-out 98 in security crosswall 86**.

When door 103 reaches fully open position, as shown in FIG. 7, a letter-type deposit, indicated generally at L and by dot-dash lines in FIG. 7 may be slipped through letter slot 93 in main door 88. After letter L has been deposited in chamber S, the customer moves door 103 toward closed position, as shown by the arrow 214 in FIG. 8. Closing movement of the door 103 is assisted by spring 126 urging main control bar 142 to the left (FIG. 8).

As door 103 moves through its final stage of movement toward fully closed position, say, to within about 10° of being fully closed as indicated in FIG. 8, secondary shoulder 155 of notch 150 on control bar 142 engages the lower back corner of cut-out portion **98*b* of cut-out 98 in security wall 86. This shoulder engagement now prevents control bar 142 from being moved to the right and thus prevents reopening of door 103**.

Further closing door 103 to fully closed position, from the position shown in FIG. 8 to that of FIG. 3, causes the main notch portion 151–152–153 of cam notch 150 on control bar 142 to fully engage security crosswall 86, such position of the notch and wall components being shown in FIG. 10.

Simultaneously, with door movement to fully closed position, from the position of FIG. 8 to that of FIG. 3, pin 181 moves to the left past the tapered end of latch 211, which yields, back to the position shown in FIG. 3 wherein pin 181 is latched by latch 211 thereby latching door 103 through latch bar 177 in closed position.

At the same time, as notch 150 of main control bar 142 becomes fully latched to security crosswall 86 (position of 150 engaged with 86 shown in FIG. 10), the righthand end of bar 142 engages the lower end of lever actuator 189 (FIGS. 10 and 12) pivoting lever 189 clockwise (FIG. 12) so that its ear 192 engages and operates microswitch 193–LS2. Actuation of switch 193 energizes a circuit to motor 40 which rotates the power screw drive shaft 43. Shaft rotation in turn, through nut 95, moves security crosswall 86 from the position of FIG. 4 to the position of FIG. 11, thereby moving security chamber S from the position of FIG. 4 to the position of FIG. 11. In the latter position, security chamber S is above chute 8 permitting the letter that was deposited in the security chamber to drop through chute 8 into chest 82. During the movement of the security chamber S away from door 103, the solenoid controlled latch 211 engaging pin 181 on actuator bar 177 holds secondary door 103 closed.

The main door 88 moves as a part of truck 85 away from secondary door 103 (FIG. 10) but main door 88 is latched in locked or closed position by main locking control bar 142 whose cam notch 150 is latched to crosswall 86.

The equipment is characterized by another or secondary locking feature in that the tongues 94 on the lower edge of door 88 ride in the grooves 35, 36, and 37 in the housing bottom wall 16 (FIG. 14) as the truck 85 traverses main housing 14 from front to rear. This prevents door 88 from being moved out of closed position in any manner. At the same time, tongues 94 rake along or scavenge the bottom wall 16 of main housing 14 to wipe anything that may lay on such bottom wall toward the rear of the housing and toward chute 8.

Figures 14, 22, 23:
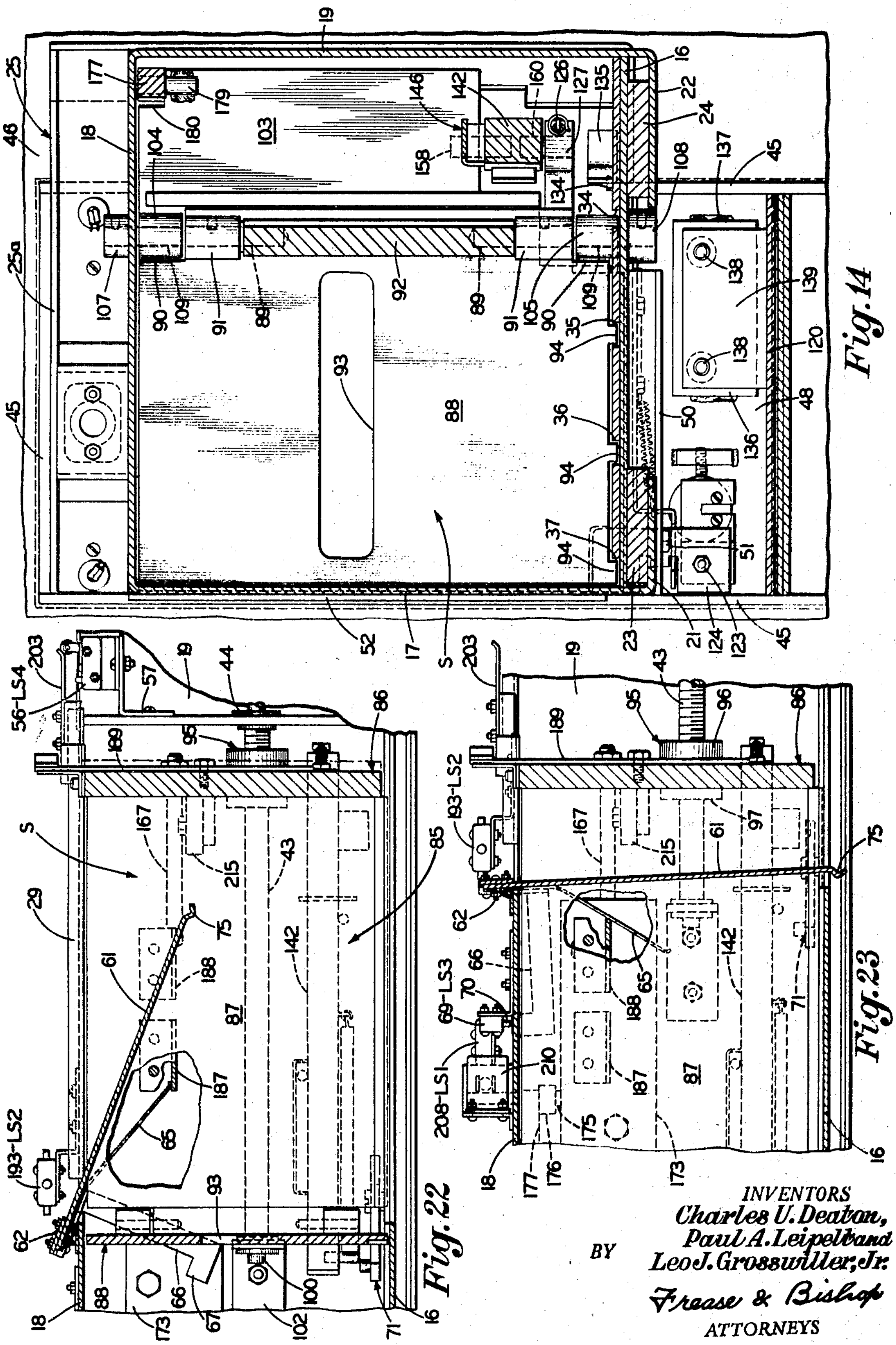
FIG. 14 is a sectional view looking in the direction of the arrows 14—14, FIG. 4.
FIG. 22 is a view similar to a portion of FIG. 11 showing the truck-like security chamber just approaching its limit of depositing movement.
FIG. 23 is a view similar to portions of FIGS. 11 and 22 showing a prior stage in the depositing movement of the truck-like security chamber.

Sensing door 61 hinged to top wall 18 of main housing 14 normally hangs flush against the front surface of security crosswall 86 (FIG. 4). As truck 85 and wall 87 move rearward, angle actuators 188 and 187, in that order, successively engage spring arm 65 on door 61 (FIGS. 13 and 23) and swing door 61 counterclockwise then drop it and swing it so that it sweeps upward and downward toward and away from crosswall 86 as the latter moves to the rear or right (FIGS. 23 and 22). As truck wall 86 approaches its limit of movement to the right (full lines in FIG. 22), spring arm 65 is just ready to drop off of angle 187; and as truck wall 86 reaches its limit of movement to the right (dot-dash lines in FIG. 22, and full lines FIG. 11), spring arm 65 is released and door 61 drops back down to normal position, if everything in chamber S has cleared out of the chamber.

As truck 85 reaches its limit of rearward movement or depositing position, angular extension switch actuator 203 engages and triggers switch 56–LS4 which is in circuit with motor 40. Actuation of switch 56 stops motor 40 and preferably reverses polarity of motor 40 so that when again energized, the motor will run in the reverse direction.

Sensing door 61 has a forwardly projecting switch arm 66 and an actuator ear 67 which releases blade 70 of switch 69–LS3 when sensing door spring arm 65 is engaged by angle actuator 188. When sensing door 61 is released, as described, at the limit of rearward truck movement, and if chamber S is entirely clear, then door 61 is permitted to drop back to normal position, as shown in FIG. 11. When this occurs, actuator ear 67 again actuates switch 69 which signals that the equipment is ready to move truck 85 back to normal position and motor 40 is started and runs to drive screw 43 to move truck 85 to the left from the position of FIG. 11.

As truck 85 returns to normal position, angle actuators 187 and 188, in that order, successively engage the back side of spring arm 65 which flexes enough to ride over actuators 187 and 188. Arm 65 then springs off of member 188, and rubber block 215 carried by wall 87 (FIG. 28) cushions the snap-back of spring arm 65 (FIG. 4).

Bar 177, link-connected to door 103, is held in the position of FIG. 10 by pin 181 being latched by latch 211 to hold door 103 closed throughout the travel of truck 85 to and from depositing position. Bar 177 also is locked to hold door 103 closed, by another and completely separate mechanism which functions even though spring 213 controlling latch 211 is damaged, or other unauthorized access is gained to pin 181 in an attempt to release latch pin 211. Pin 167 on movable truck wall 86 (FIG. 15) moves to the right to the position of FIG. 16 during the initial truck movement to the right in direction of arrow 185 (FIG. 16) and releases lever 170 so that bolt 175 engages lock-cup 176 on the underside of the rear end of bar 177. This holds bar 177 against door releasing movement until truck wall 86 has returned by the reverse movement of drive motor 40, to the position of FIG. 15, when bolt 175 is withdrawn from lock-cup 176 releasing bar 177 and permitting door 103 to open. This is part of the final resetting procedures.

Actuating pin 166 on truck wall 86 engages notch 71*a* in cam plate 71 (FIGS. 5, 27, and 28) when truck 85 is in normal deposit-receiving position, holding cam plate 71 in the position of FIG. 5 against action of spring 73 and so that cam pin 162 holds control bar 142 through member 145 in the position of FIG. 5 when door 103 is reset to be opened by a customer. As truck 85 is moved to deposit-releasing position, pin 166 moves away from cam notch 71*a* and cam plate 71 springs to the position shown in FIG. 10. During return movement of truck 85, pin 162 on cam plate 71 is in a position to be located below operating ear 145 on control bar 142 when the truck 85 approaches the normal position of FIG. 5. As the truck 85 reaches normal or reset position, actuating pin 166 engages cam notch 71*a* and moves cam 71 from the position of FIG. 10 to that of FIG. 5. During this cam movement, cam pin 162 engages operating ear 145 on bar 142 resetting the rear end of bar 142 from the position of FIG. 10 to that of FIG. 5, thereby releasing bar notch 150 from engagement with wall 86 and releasing the locking of doors 88 and 103 by the main control bar 142.

As truck 85 reaches normal or reset position, actuator ear 195 (FIGS. 3, 12 and 29) engages switch actuator 60 of switch 59–LS5, which stops motor 40. Simultaneously, solenoid 210 is energized to retract armature 212 as well as latch pin 211 to the positions of FIG. 5, thus unlatching secondary door 103 so that it can be opened. Thus, the components of the depository 1 are reset in normal position in condition to receive a deposit.

Operation when a bag is deposited

A customer desiring to make a bag-type deposit approaches the unit as in FIGS. 1 and 2 and inserts his customer key 119 in keylock 118 and turns key 119 and lock 118 clockwise to the unlocked position of FIGS. 20 and 21. This withdraws slide bolt 124 from the position of FIG. 19 to that of FIG. 20, thereby removing the upper end of bolt 124 from door obstructing position in notch 125 in the lower corner of main door 88. The customer then grasps handle 111 on secondary door 103 and pulls door 103 open. Main door 88 is biased by spring 126 against door 103 and with bolt 124 released, door 88 opens with door 103 as shown by arrow 216 in FIG. 9, exposing security chamber S for receiving a bag B. The customer places a bag B, shown in dot-dash lines in FIG. 9, in chamber S and then closes doors 88 and 103 and locks lock 118 and removes his key 119.

When key 119 is in lock 118 and lock 118 is in unlocked position (FIGS. 20 and 21), key 119 cannot be removed. Also when doors 88 and 103 are open, slide latch 130 has moved to left (dot-dash position of FIG. 21) and ear 132 engages in upper bolt notch 128 to hold lock 118 from being locked or key 119 removed. Upon closing doors 88 and 103, slide latch 130 is moved to full line position of FIGS. 20 and 21 releasing bolt 124 so that lock 118 can be locked and key 119 removed.

Once doors 88 and 103 are closed after the customer makes a bag-type deposit, the equipment automatically operates through the cycle of truck movement to discharge the deposited bag B into chute 8, to return the truck to deposit-receiving location, and to reset the equipment all in the manner described in connection with equipment operation when making an envelope-type deposit.

The U-shaped shield 144 on bar 142 (FIGS. 7, 12, 13, and 28) is a security shield to inhibit attempts to tamper with components of the mechanism located in the space between security wall 87 and housing wall 19. This can be attempted by an intruder trying to insert a fishing wire or tool into the space through the joint between curved portion 112 of door cover 110 and the cut-out notch 117 in the sleeve 45 of front frame 15.

Angle mounting bracket 53 (FIG. 24) used in assembling the front frame 15 when depository 1 is installed in wall 2 has a cut-out notch 217 for pin 134 on sliding latch 130 (FIGS. 19 and 24). Also a notch 218 is formed in upper flange 49 of member 47 (FIG. 24) through which the upper end of slide bolt 124 extends to block movement of door 88.

Security crosswall 86 is a heavy-walled component which in normal position of the mechanism extends across the housing 14 to bar access to the deposit chute 8. During movement of truck 85 including wall 86, access to chute 8 is barred by the secondary door 103, which has the several latch and bolt mechanisms described holding door 103 closed.

Another security feature of the equipment is the door cover 110 and its curved housing portion 112 and the top closure ear 113 at the upper end of portion 112. These components close at all times all zones where access might be attempted to reach the mechanisms within main housing 14 but outside the security chamber S and the interlock connections, latches, etc., for the doors 88 and 103.

Another security feature relates to equipment installation. Mounting screws, bolts, etc. for securing the outer sleeve 3, the main housing 14, and the front frame 15 assembled when installed in a wall 2 may be readily accessible for installation and repair. However, the locking bolt plunger 77 engaged in cup 76 holds the equipment assembled and against removal, even though any mounting bolts or screws accessible at the exterior have been released, except when plunger 77 is retracted from the interior of chest 82.

An alarm connection 219 with lock 118 (FIG. 2) may be made if desired, so as to signal tampering with the lock by an unauthorized person. An operational signal also is included as part of the mechanism. A cycle lamp 220 (FIG. 1) automatically comes on when the door 103 is opened and remains on until the deposit mechanism has completed its cycle of operation.

The new mechanism is characterized by convenience and simplicity. The customer need only pull the handle to make an envelope deposit. When the door swings open, the envelope slot is exposed into which the envelope is inserted and the door is then closed by the customer. In making a bag deposit, in addition the customer first uses his key to unlock the door, then the handle is pulled exposing the security chamber into which the bag is placed. Then the door is closed and the key removed.

Having made in the deposit in either instance, the customer need do nothing more. When the door is fully closed, it automatically initiates the electrically operated delivery of the bag or envelope to the receiving chest. Once the deposit (envelope or bag) is in the security chamber and the door closed, the deposit cannot be retrieved since the door is deadlocked upon closing, and cannot be reopened until the deposit cycle is completed. Because of this automatic operation, there is no need to rely on customer performance for successful and safe completion of the depositing operation. This is of great importance in terms of security and convenience.

Further, the depository is deadlocked in event of power failure. Thus, the solenoid is deenergized if there is a power failure, and pin 211 which is spring-pressed to latching position latches bar 177 to hold door 103 closed. If the power failure is due to the activity of an intruder, and an attempt is made to gain access to the chest through the depository by releasing pin 211 in some manner, such as by forceful movement of the truck, the door is again locked by bolt 175 seating in cup 176 (FIG. 16), even though the threads of shaft 43 are stripped by the attempt of forceful entry.

Security is achieved additionally by locking of the depository head to the receiving chest so that it can only be released by access within the chest.

Simplicity, convenience, and efficiency are enhanced further by the structural arrangement of the mechanism essentially as a box-like device involving simple rectilinear movement of its conveyor truck. Installation involves only a relatively small opening of an uncomplicated rectangle which helps minimize construction costs and space utilization. Also because of the straight vertical drop through a simple vertical chute 8, a maximum chest height can be used and any desired size or type of receiving chest can be installed. This eliminates a sloping chute heretofore required by many prior devices. The sloping chute not only requires additional space or wall thickness, but it can be the medium used for an intruder to install trapping devices along the slope.

Simplicity is also involved in the ability to operate the equipment with one hand which adapts its use to drive-in depositories available outside of banking hours.

Accordingly, the improved construction is simplified, provides an effective, safe, inexpensive and efficient device accepting either envelope-type or bag-type deposits without dependence on the customer for proper operation, provides a depository achieving all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of construction shown or described.

Having now described the features, discoveries and principles of the invention, the manner in which the improved depository is constructed, assembled and operated, the characteristics of the new construction, and the advantageous, new and useful results obtained; the new and useful structures, devices, elements, arrangements, parts, and combinations are set forth in the appended claims.

We claim:

1. Depository construction including box-like top, bottom, and side housing walls forming a rectangular front opening at one end of the housing, a cut-out discharge opening formed in the bottom wall near the other housing end; truck means including a rear crosswall, a longitudinal security wall and a primary door having an envelope slot hinged to the security wall within the front opening; the truck means being mounted for rectilinear movement within the housing between normal position at said one housing end and depositing position at the other housing end; the truck means crosswall, security wall and primary door forming with the housing top, bottom, and one side wall a security chamber movable with the truck means between said normal and depositing positions; the chamber communicating with the discharge opening when the chamber is in depositing position; a secondary door hinged to the housing on an axis coaxial with the primary door axis and located adjacent the primary door when the truck means is in normal position; means for selectively moving through an opening and closing cycle said secondary door, or said primary and secondary doors collectively, when the truck means is in normal position; means automatically locking said secondary door closed upon completing one opening and closing cycle; drive means actuated upon completion of said one opening and closing cycle to drive the truck means from normal to depositing position and back to normal position; and means actuated upon arrival of the truck means back at normal position to unlock the secondary door.

2. The construction defined in claim 1 in which a sleeve having top, bottom, and side walls forming a front opening is adapted to be mounted extending generally horizontally in a building wall, in which the sleeve bottom wall is provided with an opening at the rear thereof, and in which a downwardly directed chute communicates with said opening and with a security chest mounted within such building wall.

3. The construction defined in claim 1 in which the housing and truck means are adapted to be mounted extending generally horizontally within a building wall communicating through said cut-out discharge opening with and accessible to the interior of the building wall; in which the depository front opening is accessible exteriorly of such building wall; in which lock means are mounted in such building wall locking the housing therein; and in which release means for said housing lock means extends to a location accessible interiorly of the building wall for actuation.

4. The construction defined in claim 1 in which the housing and truck means are adapted to be mounted extending generally horizontally within a building wall above a receiving chest, and in which vertically extending chute means is mounted in such building wall forming communication between the housing cut-out discharge opening and such receiving chest.

5. The construction defined in claim 1 in which the top and bottom housing walls are L-shaped; in which one of the side walls is elongated along the long legs of the L-shaped top and bottom walls; in which there is a rear wall at the rear ends of said top, bottom, and elongated side walls; in which the drive means includes a rotatable drive shaft, and support bearings for said drive shaft mounted on said rear housing wall and on said elongated side wall; and in which the drive shaft has driving connection with said truck crosswall.

6. The construction defined in claim 1 in which the truck means is slidably mounted for rectilinear movement within the housing between normal and depositing positions; in which said slidable mounting includes an upturned flange on the housing top wall, and a grooved glide member mounted on the truck means with the glide member groove engaged and slidably supported on said upturned flange; and in which said slidable mounting also includes a glide member mounted on and extending along the lower edge of said longitudinal security truck wall and has a projecting portion slidably engaged in a groove formed in the housing bottom wall.

7. The construction defined in claim 6 in which a series of longitudinally extending laterally spaced strips forming intervening grooves are mounted on the housing bottom wall; in which said projecting portion of the glide member mounted on the lower edge of said longitudinal security truck wall is engaged in and slides in one of said grooves; and in which said primary door has a series of tongues projecting from its lower edge slidably engageable in said bottom wall grooves as the truck means moves along the bottom wall between normal and depositing positions.

8. The construction defined in claim 7 in which the glide members are formed of nylon.

9. The construction defined in claim 1 in which the primary and secondary doors are hinged on vertical axes; in which hinge receiving elements of the primary door hinge mounting are spaced below and above the upper and lower edges of the primary door; and in which hinge receiving elements of the secondary door hinge mounting are mounted on the upper and lower housing walls above and below the primary door hinge receiving elements, whereby the primary and secondary doors collectively may be moved between open and closed positions, and whereby the primary door may be moved rectilinearly away from and toward the secondary door during truck movement.

10. The construction defined in claim 1 in which the longitudinal security truck wall is spaced laterally from one of the housing sidewalls forming a longitudinally extending mechanism-compartment between said spaced security and side walls.

11. The construction defined in claim 10 in which the drive means includes a rotatable drive shaft extending longitudinally within said mechanism-compartment between said security and side walls; and in which said drive shaft has driving engagement with a drive nut engaged with the truck crosswall.

12. The construction defined in claim 10 in which control bar means is movably mounted in said mechanism-compartment; in which said control bar means is relatively movably supported on said security wall and is movable along with said security wall; in which the control bar means is pivotally engaged at its forward end with the primary door; and in which spring means is provided reacting between the primary door and control bar means biasing the primary door to open and the control bar means to move forward relative to the security wall.

13. The construction defined in claim 1 in which control bar means is movably mounted on and relative to and for movement with the truck means; in which the control bar means is pivotally engaged at its forward end with both doors when the control bar means and doors are in normal position; in which spring means reacts between the primary door and control bar means biasing the primary door to open and the control bar means to move forward relative to the security wall; and in which the control bar means moves out of normal position to a position latching the primary door closed upon completing one door opening and closing cycle.

14. The construction defined in claim 13 in which switch means is provided actuated upon arrival of the control bar means at a position locking the primary door closed to energize the drive means for driving the truck means from normal to depositing position.

15. The construction defined in claim 14 in which means is provided actuated upon arrival of the truck means at depositing position to stop the drive means.

16. The construction defined in claim 15 in which sensing means is provided operative to sweep through the security chamber on arrival of the truck means at discharging position to detect the absence of deposited material in the security chamber; and in which said sensing means in the absence of deposited material in the security chamber moves to a position to energize the drive means to convey the truck means back to normal position.

17. The construction defined in claim 1 in which the means actuated upon arrival of the truck means back at normal position to unlock the secondary door includes a control pin operatively connected with the secondary door, a latch pin latching the control pin against movement when the secondary door is locked, said latch pin being biased to latching position, solenoid means operatively connected with the latch pin to move the latch pin to non-latching position when the solenoid is energized, and switch means actuated on arrival of the truck means at normal position to energize the solenoid.

18. The construction defined in claim 1 in which control bar means is provided movably mounted on the truck means; in which said control bar means is engaged with the primary door and movable with the door during opening and closing door movement when the control bar means and primary door are in normal position; in which spring means is provided biasing the control bar means to open the primary door; in which said control bar means is movable out of normal position to a position latching the primary door closed upon completing one door opening and closing cycle; in which cam plate means is provided having releasable engagement with the control bar means and truck means; and in which the cam plate means is actuated upon arrival of the truck means at normal position to release the control bar means latching of the primary door and to reset the control bar means to normal position.

19. The construction defined in claim 1 in which the means automatically locking said secondary door closed upon completing one opening and closing cycle includes a latch bar pivotally connected at one end with the secondary door, a control pin slidably connected with the housing mounted at the other end of the latch bar, latch pin means movable between release and latching positions adapted to block movement of the control pin when in latching position, said latch pin means being normally in release position, and means actuated upon movement of the secondary door toward open position moving the latch pin means to latching position to block movement of the secondary door after the door has returned to closed position.

20. The construction defined in claim 19 in which the longitudinal security truck wall is spaced laterally from one of the side walls forming a longitudinally extending mechanism-compartment between said spaced security and side walls, and in which said latch bar is located and movable in said mechanism-compartment.

21. The construction defined in claim 1 in which the means automatically locking said secondary door closed upon completing one opening and closing cycle includes a latch bar pivotally connected at one end with the secondary door, and pin means for latching said latch bar in secondary door closing position; and in which secondary bolt means independent of said pin means is mounted on the housing actuated upon movement of the truck means away from normal position to bolt the latch bar in secondary door locking position.

22. The construction defined in claim 21 in which the pin means for latching the latch bar in secondary door closing position includes a solenoid released spring actuated latch pin latching the latch bar in secondary door latching position when the solenoid is deenergized.

23. The construction defined in claim 22 in which switch means is provided to energize the solenoid, and in which said switch means is actuated by the latch bar upon opening movement of the secondary door to deenergize the solenoid.

24. The construction defined in claim 1 in which sensing means is provided extending into the security chamber and movable in the security chamber during truck movement between normal and depositing positions, and also movable in the security chamber when said truck means is at depositing position; and in which means is provided for moving said sensing means repeatedly back and forth through said security chamber during said truck movement.

25. The construction defined in claim 24 in which the sensing means includes a door pivotally mounted on the housing top wall normally extending flush with the front face of the truck crosswall when the latter is in normal position; and in which spaced actuator means are mounted on the truck means engageable with the sensing means to swing the sensing door back and forth through the security chamber during truck movement.

26. The construction defined in claim 25 in which a spring arm is connected with said sensing door, successively engaging said spaced actuator means to swing the sensing door back and forth through said security chamber.

27. The construction defined in claim 24 in which spaced actuator means is provided engageable with the sensing means repeatedly moving said sensing means back and forth through the security chamber during truck movement; in which said actuator means releases said sensing means to sweep downward and forward through the security chamber upon arrival of the truck means at depositing position whereby the sensing means detects the presence and absence of deposited material in the security chamber at depositing position; in which switch means is provided to control the drive means for conveying the truck means back to normal position; and in which said switch means is actuated to energize the drive means upon detection by the sensing means of the absence of deposited material in the security chamber at depositing position.

28. The construction defined in claim 1 in which key-operated-lock-controlled slide bolt means is mounted on the housing bolting the primary door against opening when the latter is in normal deposit-receiving position; and in which the slide bolt means is movable from bolted to unbolted position upon unlocking the key-operated lock.

29. The construction defined in claim 28 in which the primary door is biased to open automatically along with the opening of the secondary door when the slide bolt means is in unbolted position.

30. The construction defined in claim 28 in which sliding latch means is mounted on the housing engaged with the secondary door biased to latching position; and in which said sliding latch means latches the slide bolt means in bolted position when the secondary door is opened.

31. The construction defined in claim 28 in which sliding latch means is mounted on the housing engaged with the secondary door biased to latching position; and in which the sliding latch means latches the slide bolt means in unbolted position upon opening the secondary door.

32. The construction defined in claim 28 in which sliding latch means is mounted on the housing engaged with the secondary door biased to latching position; in which the sliding latch means latches the slide bolt means in either bolted or unbolted position upon opening the secondary door, and in which the slide bolt means has a plurality of notches, one of which is engaged by the sliding latch means when the slide bolt means is in bolted position and the other of which is engaged by the sliding latch means when the slide bolt means is in unbolted position.

References Cited

UNITED STATES PATENTS

| | | | |
|---|---|---|---|
| 1,759,129 | 5/1930 | McClintock et al. | 232—44 |
| 1,838,581 | 12/1931 | Sioberg | 232—44 |
| 2,548,338 | 4/1951 | Behrens | 232—43.3 |
| 2,842,308 | 7/1958 | Massengill | 232—44 |
| 2,963,333 | 12/1960 | Mestre | 232—44 X |
| 3,028,074 | 4/1962 | Graber et al. | 232—44 |
| 3,059,839 | 10/1962 | Graber | 232—44 |
| 3,059,840 | 10/1962 | Graber et al. | 232—44 |
| 3,114,499 | 12/1963 | Graber et al. | 232—44 |

FRANCIS K. ZUGEL, Primary Examiner

U.S. Cl. X.R.

232—44